US007722458B2

(12) United States Patent
Walker et al.

(10) Patent No.: US 7,722,458 B2

(45) Date of Patent: May 25, 2010

(54) GAMING DEVICE METHOD AND APPARATUS EMPLOYING ALTERNATE PAYOUT FEATURES

(75) Inventors: Jay S. Walker, Ridgefield, CT (US); James A. Jorasch, Stamford, CT (US); Geffrey M. Gelman, Stamford, CT (US); Magdalena M. Fincham, Norwalk, CT (US)

(73) Assignee: IGT, Reno, NV (US)

( * ) Notice: Subject to any disclaimer, the term of this patent is extended or adjusted under 35 U.S.C. 154(b) by 1650 days.

(21) Appl. No.: 10/689,975

(22) Filed: Oct. 21, 2003

(65) Prior Publication Data

US 2004/0242319 A1 Dec. 2, 2004

Related U.S. Application Data

(60) Provisional application No. 60/420,223, filed on Oct. 21, 2002.

(51) Int. Cl.
*A63F 9/24* (2006.01)
*A63F 13/00* (2006.01)

(52) U.S. Cl. .............................. 463/25; 463/16; 463/20; 463/29; 463/42

(58) Field of Classification Search .................. 463/16, 463/20, 25, 29, 40–42
See application file for complete search history.

(56) References Cited

U.S. PATENT DOCUMENTS

| | | | | |
|---|---|---|---|---|
| 4,669,731 A | | 6/1987 | Clarke | 273/143 R |
| 5,092,598 A | | 3/1992 | Kamille | 273/139 |
| 5,123,649 A | | 6/1992 | Tiberio | 273/143 R |
| 5,456,465 A | | 10/1995 | Durham | 273/138 A |
| 5,511,781 A | | 4/1996 | Wood et al. | 273/85 CP |
| 5,570,885 A | | 11/1996 | Ornstein | 463/27 |
| 5,772,509 A | | 6/1998 | Weiss | 463/16 |
| 5,830,067 A | | 11/1998 | Graves et al. | 463/40 |
| 5,851,010 A | * | 12/1998 | Feinberg | 273/274 |
| 5,851,147 A | * | 12/1998 | Stupak et al. | 463/13 |
| 5,967,896 A | | 10/1999 | Jorasch et al. | 463/25 |
| 5,980,384 A | | 11/1999 | Barrie | 463/16 |
| 5,997,401 A | | 12/1999 | Crawford | 463/20 |
| 6,024,642 A | | 2/2000 | Stupak | |

(Continued)

OTHER PUBLICATIONS

Website: "Press Your Luck (PYL) General Information Page", (http //members fortunecity com/jd83/pylinfo html), undated.

(Continued)

*Primary Examiner*—John M Hotaling, II
*Assistant Examiner*—Ryan Hsu
(74) *Attorney, Agent, or Firm*—K&L Gates LLP

(57) ABSTRACT

In accordance with one or more embodiments, a gaming device includes a novel payout structure wherein, upon placing a wager, an initial value of a prize is established at the gaming device. During the duration of a game play (which may last, in one or more embodiments, for a predetermined number of rounds or a predetermined amount of time) the value of the prize is adjusted based on outcomes or symbols obtained by the player. For example, the value of the prize may be decreased from a substantially high initial value over the course of a game play. At the end of the game play, a player is provided with a prize based on the final value of the prize.

44 Claims, 9 Drawing Sheets

U.S. PATENT DOCUMENTS

| | | | | |
|---|---|---|---|---|
| 6,203,430 | B1 | 3/2001 | Walker et al. | |
| 6,224,482 | B1 | 5/2001 | Bennett | |
| 6,309,300 | B1 | 10/2001 | Glavich | 463/26 |
| 6,319,127 | B1 * | 11/2001 | Walker et al. | 463/26 |
| 6,379,248 | B1 | 4/2002 | Jorasch et al. | 463/25 |
| 6,406,369 | B1 | 6/2002 | Baerlocher et al. | |
| 6,409,172 | B1 | 6/2002 | Vancura | 273/256 |
| 6,425,824 | B1 | 7/2002 | Baerlocher et al. | 463/16 |
| 6,471,208 | B2 | 10/2002 | Yoseloff et al. | 273/143 R |
| 6,494,785 | B1 | 12/2002 | Gerrard et al. | 463/20 |
| 6,506,118 | B1 * | 1/2003 | Baerlocher et al. | 463/25 |
| 6,632,141 | B2 * | 10/2003 | Webb et al. | 463/25 |
| 6,702,670 | B2 | 3/2004 | Jasper et al. | |
| 2002/0052232 | A1 | 5/2002 | Kaminkow | |
| 2003/0028622 | A1 * | 2/2003 | Inoue et al. | 709/219 |
| 2003/0220138 | A1 * | 11/2003 | Walker et al. | 463/25 |

OTHER PUBLICATIONS

Brochure: "Power Play Slots", (http //www softsite com/ulti/), Jan. 1997.

Poole, David, "Letter from Charlotte: Vegas perfect for racing", Las Vegas Review-Journal, Jun. 22, 1997, Section: C, p. 2C.

Cook, Melissa, "The Best New Slots", Casino Player Magazine, Apr. 1998, p. 45.

Website: "Casino Journal World of Slots AC Coin—The Interactive Experience", (http //www casinocenter com/journal/oct97/html/ac_coin html), download date: Jun. 4, 1998.

"Jeopardy! ® Video Slot is Latest IGT Megajackpots Offering in Nevada", PR Newswire, Oct. 13, 2000, Section: Financial News.

"A.C. Coin & Slot Staying Power", Global Gaming Business, Sep. 15, 2002, p. 42.

* cited by examiner

500

| PLAYER IDENTIFIER 505 | NAME 510 | ADDRESS 515 | FINANCIAL ACCOUNT IDENTIFIER 520 | DEMOGRAPHIC 525 |
|---|---|---|---|---|
| P111123 | SAM BROWN | ANYPLACE, USA | 1111-1111-1111-1111 | MALE, AGE 23 |
| P222234 | LINDA JONES | SOMEPLACE, USA | 2222-2222-2222-2222 | FEMALE, AGE 47 |

500 (CONT.)

| PRIVILEGE(S) 530 | LIFETIME COIN IN 535 | LIFETIME THEORETICAL WIN / (LOSS) 540 |
|---|---|---|
| AVOID A SPIN, STOP AFTER TWO SPINS | $600 | $54 |
| RECOVER ORIGINAL WIN BALANCE (NOT VALID AFTER TWO SPINS), DOUBLE WIN BALANCE | $14,400 | $720 |

FIG. 5

600

| OUTCOME 605 | EFFECT 610 | PROBABILITY 615 |
|---|---|---|
| BAR-BAR-BAR | DIVIDE WIN BALANCE BY 3 | 8/20 |
| BAR-7-BAR | DIVIDE WIN BALANCE BY 10 | 3/20 |
| BAR-BAR-7 | TAKE 90% OF THE WIN BALANCE | 3/20 |
| 7-BAR-BAR | SUBTRACT 300 FROM THE WIN BALANCE | 3/20 |
| 7-BAR-7 | SUBTRACT 900 FROM THE WIN BALANCE | 2/20 |
| 7-7-7 | NO EFFECT | 1/20 |

FIG. 6

800

| | PAIRS OF OUTCOMES FOR GAME PLAY 805 | PROBABILITY OF THE PAIR OCCURRING 810 | REDUCTION TO BALANCE OF WINNINGS 815 | EXPECTED REDUCTION TO BALANCE OF WINNINGS 820 |
|---|---|---|---|---|
| R801 | AA | P(A)P(A) = 1/2*1/2 = 1/4 | L(A)+L(A) > 5 → 5 | 1/4*5 = 5/4 = 1.25 |
| R802 | AB | P(A)P(B) = 1/2*1/4 = 1/8 | L(A)+L(B) > 5 → 5 | 1/8*5 = 5/8 = 0.625 |
| R803 | AC | P(A)P(C) = 1/2*1/4 = 1/8 | L(A)+L(C) = 5 → 5 | 1/8*5 = 5/8 = 0.625 |
| R804 | BA | P(B)P(A) = 1/4*1/2 = 1/8 | L(B)+L(A) > 5 → 5 | 1/8*5 = 5/8 = 0.625 |
| R805 | BB | P(B)P(B) = 1/4*1/4 = 1/16 | L(B)+L(B) = 4 → 4 | 1/16*4 = 1/4 = 0.25 |
| R806 | BC | P(B)P(C) = 1/4*1/4 = 1/16 | L(B)+L(C) = 2 → 2 | 1/16*2 = 1/8 = 0.125 |
| R807 | CA | P(C)P(A) = 1/4*1/2 = 1/8 | L(C)+L(A) = 5 → 5 | 1/8*5 = 5/8 = 0.625 |
| R808 | CB | P(C)P(B) = 1/4*1/4 = 1/16 | L(C)+L(B) = 2 → 2 | 1/16*2 = 1/8 = 0.125 |
| R809 | CC | P(C)P(C) = 1/4*1/4 = 1/16 | L(C)+L(C) = 0 → 0 | 1/16*0 = 0 |
| | TOTAL EXPECTED REDUCTION TO BALANCE OF WINNINGS FOR A GAME PLAY: | | | 4.25 825 |
| | EXPECTED BALANCE OF WINNINGS FOR A GAME PLAY: | | | $= W_0 - 4.25$ = 5 - 4.25 = 0.75 830 |

FIG. 8

900

| INITIAL BALANCE OF WINNINGS: $1,000,000 905 | |
|---|---|
| EFFECT OF OUTCOME 910 | PROBABILITY OF OUTCOME 915 |
| DIVIDE BW BY 3 | 0.40 |
| DIVIDE BW BY 10 | 0.15 |
| TAKE SQUARE ROOT OF BW | 0.15 |
| DEDUCT $300,000 FROM BW | 0.15 |
| DEDUCT $900,000 FROM BW | 0.10 |
| NO CHANGE IN BW | 0.05 |

950

| WAGER: $10 955 | |
|---|---|
| NUMBER OF ROUNDS 960 | PRIZE 965 |
| 2-4 | $0 |
| 5 | $1 |
| 6 | $3 |
| 7 | $6 |
| 8 | $12 |
| 9 | $18 |
| 10 | $25 |
| 11 | $40 |
| 12 | $100 |
| > 12 | $2,000 |

FIG. 9

GAMING DEVICE METHOD AND APPARATUS EMPLOYING ALTERNATE PAYOUT FEATURES

PRIORITY CLAIM TO CO-PENDING APPLICATIONS

This application claims the benefit of priority of U.S. Provisional Patent Application No. 60/420,223, entitled "METHOD AND APPARATUS FOR CONDUCTING A GAME OF CHANCE WITH A RESTRICTED BALANCE," filed on Oct. 21, 2002. This application is incorporated herein by reference in its entirety and for all purposes.

RELATED APPLICATIONS

This application is related to, commonly-owned U.S. application Ser. No. 10/420,981, which was filed Apr. 22, 2003, and which claims the benefit of priority of U.S. Provisional Application No. 60/374,625, filed Apr. 22, 2002. Each of the above applications is incorporated herein by reference in its entirety and for all purposes.

BACKGROUND

Gaming devices such as slot machines generate more than $15 billion in revenue per year for U.S. casinos. In fact, most casinos generate more than half of their gaming revenue from gaming devices such as slot machines. To take advantage of the popularity of slot machines and other gaming devices, some casinos offer three or four thousand slot machines in a single location.

Despite the popularity of gaming devices in casinos, players continually get bored with the games available and demand innovation and change to stimulate their ongoing interest. In response, gaming device manufacturers and game designers continually strive to develop new types of games. However, despite the continuing efforts to develop new games, other aspects of the gaming experience have to date not been significantly changed or improved to stimulate player interest. For example, the payout structure of most gaming devices is very traditional and has not changed much in generations of gaming devices.

In most gaming devices, a payout table depicts which outcomes obtainable on a gaming device correspond to payouts. As a player obtains an outcome that corresponds to a payout in the payout table, the corresponding payout amount is added to the player's credit meter balance. Payouts for a typical game vary from a handful of coins to five hundred coins. Of course, payouts as high as several thousand or a million dollars are available on some select gaming devices. However, such high payouts, if available at all, typically correspond to one outcome in a payout table and this outcome is one that is very rarely achieved. In other words, in the typical payout structure of most gaming devices payouts of amounts significant enough to stimulate player excitement are not always available and, if available, are rarely achieved. This is due to the casino's need to remain profitable.

Unfortunately, the casinos' need for profitability results in a lack of excitement on players' part over small payouts and frustration over the infrequency of larger payouts. Accordingly, a need exists for a new and innovative payout structure that stimulates more excitement in players than do conventional payout structures.

BRIEF DESCRIPTION OF THE DRAWINGS

FIG. 5 is a table illustrating an exemplary data structure of a player database, for use in at least one embodiment of the present invention.

FIG. 6 is a table illustrating an exemplary data structure of a payout database, for use in one or more embodiments of the present invention.

FIG. 8 is a table illustrating an exemplary calculation, for use in one or more embodiments of the present invention.

FIG. 9 is a pair of tables illustrating a payout database, for use in one or more embodiments of the present invention.

DETAILED DESCRIPTION OF EMBODIMENTS OF THE INVENTION

Figure 1:
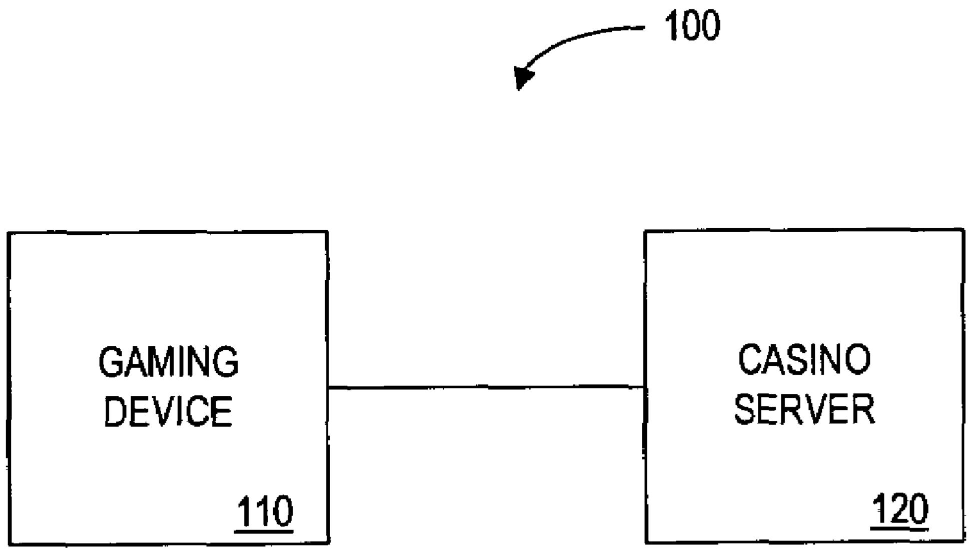
FIG. 1 is a block diagram of a system consistent with at least one embodiment of the present invention.

Applicants have recognized that current payout structures are unsatisfying to many players because substantially large prizes are so infrequently obtained by the player. Applicants have further recognized that even when a player obtains a large prize, a player often savors the excitement of the large prize but then (rather than cashing out the large prize to spend elsewhere) the player continues to risk the prize on subsequent wagers. Applicants have further recognized that even when such a player loses all or most of the large prize, the player is typically still quite satisfied with the time spent playing the gaming device due to the briefly experienced, even if eventually unrealized, large prize. Thus, Applicants have recognized that experiencing a substantially large prize is a very exciting and satisfying experience for a player, even if the player does not retain or keep the large prize at the end of a gaming session.

Applicants have further recognized that most gaming devices today offer the same conventional payout structure, where a player attempts to earn a large prize over the course of a series of game plays. Applicants have recognized that many players are intimidated or frustrated with the perceived futility of ever obtaining a large prize.

Applicants have further recognized that, psychologically, a typical person views an opportunity to keep something that has already been provided to them as an easier feat than attempting to earn that something when starting with nothing.

Thus, in accordance with one or more embodiments, a variety of new payout structures are described herein, in which a large prize is initially provided to a player when a player first initiates a game play on a gaming device. In order to be provided with this large prize at the end of the game play, however, the player is required to "survive" a plurality of rounds of the game play by obtaining outcomes that do not have the effect of decreasing the value of the prize. In other words, the value of the prize initially provided to the player is adjusted throughout the game play, based on outcomes obtained by the player during the game play. One or more of such outcomes may correspond to an effect that, when applied to the value of the prize, results in a decrease in the value of the prize. Alternatively or additionally, one or more outcomes obtained by a player may include a symbol that (perhaps when accumulated with additional symbols or occurrences of the same symbol) may correspond to an effect that, when applied to the value of the prize, results in a decrease in the value of the prize (e.g., the value of the prize is decreased by half when the player obtains five cherry symbols over the course of a plurality of outcomes during a game play). At the end of a game play, the player is provided with a prize that corresponds to the value of the prize after the effects of the various outcomes obtained by the player have been applied.

In accordance with one or more embodiments, a method comprises (i) receiving, at a gaming device, a wager for initiating a game play of a game, wherein the game play comprises a predetermined number of rounds of the game and the wager is an amount sufficient to pre-pay for the predetermined number of rounds; (ii) establishing, in response to the wager, an initial balance of winnings, wherein the initial balance of winnings is greater than the amount of the wager; (iii) determining a predetermined number of outcomes, the predetermined number of outcomes comprising at least one respective outcome for each of the predetermined number of rounds; (iv) adjusting the initial balance of winnings based on at least one of the determined outcomes, thereby determining a current balance of winnings, wherein at least one of the outcomes causes the current balance of winnings to be less than the initial balance of winnings; (v) determining, after the predetermined number of rounds has been concluded, a final balance of winnings; and (vi) providing the final balance of winnings to a player who initiated the game play.

In accordance with one or more embodiments, a method comprises (i) receiving, at a gaming device, a wager for initiating a game play of a game, wherein the game play comprises a predetermined amount of time during which consecutive rounds of the game are to be played; (ii) establishing, in response to the wager, an initial balance of winnings, wherein the initial balance of winnings is greater than the amount of the wager; (iii) determining a number of outcomes during the predetermined amount of time, each of the outcomes corresponding to a respective round of the game; (iv) adjusting the initial balance of winnings based on at least one of the determined outcomes, thereby determining a current balance of winnings, wherein at least one of the outcomes causes the current balance of winnings to be less than the initial balance of winnings; (v) determining, at the end of the predetermined amount of time, a final balance of winnings; and (vi) providing the final balance of winnings to a player who initiated the game play.

In accordance with one or more embodiments, a method comprises (i) establishing, at the initiation of a game play at a gaming device, an initial value of a prize, wherein the game play ends once at least one of a predetermined number of rounds of the game are completed and a predetermined amount of time has passed; (ii) determining a series of outcomes for the game play, each respective outcome corresponding to a round of the game play; (iii) adjusting the initial value of the prize based on the determined outcomes, thereby determining a current value of the prize, wherein at least one of the determined outcomes causes the current value of the prize to be less than the initial value of the prize; (iv) determining, once the game play ends, a final value of the prize; and (v) outputting the prize of the final value to a player.

In accordance with one or more embodiments, a player at the end of a game play is provided with a prize the value of which is determined based on how many rounds of the game play the player completed before the value of the prize initially displayed to the player was decreased to a predetermined amount (e.g., zero). Thus, for example, a player at the end of a game play may be provided with a prize of a first value if the player completes a first number of rounds of the game play before the value of the prize initially displayed to the player is decreased to zero and a prize of a second value (which is greater than the first value) if the player completes a second number of rounds (the second number being greater than the first number) before the value of the prize initially displayed to the player is decreased to zero.

In accordance with one or more embodiments, a method comprises (i) establishing, at a gaming device, an initial value of a prize that is distinct from a balance of credits available to a player for wagering at the gaming device; (ii) determining a series of outcomes; (iii) adjusting the initial value of the prize after each of the outcomes, based on an effect associated with the outcome, wherein at least one of the outcomes causes the final value of the prize to be less than the initial value of the prize; (iv) determining that the current value of the prize is zero; (v) determining a number of outcomes that were determined before the current value of the prize reached zero; and (vi) providing a reward to the player based on the number of outcomes.

The above-described embodiments are exemplary only. Various other embodiments of the present invention are described in detail below.

The following example may be helpful in illustrating how one or more of the above-described embodiments of the invention may be practiced. It should be noted that the example is provided for illustrative purposes only and is not to be construed as limiting in any manner.

EXAMPLE

Tracy was a veteran slot player. One day on the casino floor, she noticed a new slot machine. She walked up to examine it, and noticed the following message on its screen: "Start every game with $1,000,000!!! All you have to do is survive for five handle pulls without losing any money, and you keep the million. Even if you lose some, you get to keep whatever is left over after five pulls!" Tracy was excited about winning $1,000,000, but she was a little confused. What did it mean to survive five handle pulls? What would the handle pulls do to her? She examined the pay table of the slot machine. The pay table was different from any she had seen before. The pay table contained a familiar list of outcomes, like "bar-bar-bar", and "orange-orange-orange ", but rather than seeing the numerical payouts she was used to, she saw payouts consisting of text and numbers. For example, one payout read, "lose $500,000 ". Another read, "reduce Win Balance by a factor of 1000". In fact, almost every outcome was detrimental. Only one outcome, "bell-bell-bell" did not have a negative effect. Next to "bell-bell-bell" was the text, "Lose $0".

Tracy now thought she understood. She would have to get a couple of bell-bell-bell outcomes in order to keep most of her million intact. Otherwise, the million would be drastically reduced or eliminated altogether. Still, the thought of having those million dollars at least temporarily in her possession seemed exciting. Keeping the million would be only a matter of surviving, not performing miracles, as required by other slot machines.

Tracy inserted a dollar into the slot machine. An area of her screen labeled "Win Balance" now displayed $1,000,000. Seeing the balance, Tracy couldn't help playing a joke and calling over her long time friend Jane. "Look what I won, Jane!"

When Jane saw, she nearly fainted. She calmed down a bit when Tracy explained how the machine really worked. Still Jane was curious enough to stay and watch.

Another area of Tracy's screen was labeled "Spins Remaining." The number 5 was displayed. Tracy made her first spin, and the number decremented to 4. The first spin was "7-bell-plum ". Tracy saw her Win Balance go down to $10,000. She checked the pay table. The outcome wasn't listed individually, but seemed to fall under the category of "Other". The effect of any "Other" outcome was to reduce the Win Balance by a factor of 100. Tracy mourned the loss of her million, but she was still happy she had $10,000 left. The second spin reduced her balance by a factor of 2, giving her $5,000. The third spin reduced her balance by a factor of 100, leaving her with a balance of winnings of $50. The fourth spin reduced her balance by a factor of 10, leaving her with a balance of winnings of $5. The fifth spin took away $250,000. Losing $250,000 was a bit of an overkill for a balance of $5, but in the end Tracy was left with $0. Still, for the chance at one million dollars, she had only lost a dollar.

Tracy inserted another dollar, and there was that wonderful million again! After her next series of five spins, Tracy was left with a $5 Win Balance. Now $5 dropped into her tray.

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The terms "balance of winnings" and "value of a prize" are used interchangeably and may refer to a potential value of a prize being tracked during a game play, but not available for cash out by the player until the end of the game play. The prize may be monetary or non-monetary. It is a potential value of a prize because the final value of the prize is what is actually provided to the player, with any intermediate balance of winnings or value of a prize during the course of a game play but before the end of a game play merely indicates the value of a prize that may potentially be provided to the player, unless adjusted based on the remainder of the game play. The prize may be, for example, an amount of electronic credits, currency, a product, a service, an amount of comp points and/or a comp to be provided to the player by the casino. It should be noted that, in some embodiments of the present invention, a player is unable to cash out or have otherwise provided to him the balance of winnings until the game play for which the balance of winnings is being tracked is completed. In some embodiments, the final balance of winnings is transferred to the credit meter balance of the gaming device. Note that a balance of winnings is distinct from a balance of a credit meter of a gaming device.

The term "casino" may refer to the owner of gaming devices, owners' agents, and/or any entity who may profit from players' use of the gaming devices.

The term "casino server" may refer to any device that is operable to communicate with one or more gaming devices, one or more third-party servers, one or more remote controllers, one or more player devices, and/or other network nodes, and may be capable of relaying communications to and from each.

The term "credit meter balance" may refer to a balance of electronic credits stored in a gaming device being played by a player and available for wagering on game plays, at the player's discretion. In other words, the player exclusively controls how and when the electronic credits in the credit meter balance are utilized. Additionally, the credit meter balance is the balance of credits available for a player to cash out of the gaming device, at the player's discretion.

The term "effect" may refer to a consequence of obtaining a particular outcome on a gaming device. An effect may comprise an effect on a balance of winnings that is being tracked during a game play. For example, an effect may comprise a reduction of a balance of winnings by a predetermined amount or based on a particular function.

The term "game" may refer to a set of rules and a format that define how a player may win a prize at a gaming device.

The term "game play" may refer to a single attempt or bid by a player to win a prize by playing a game of a gaming device in accordance with the rules defining the game. A game play begins when the player places a wager for the attempt and ends when the final result of the attempt is displayed to the player and the gaming device becomes available for the next game play. For example, a game consistent with embodiments of the present invention may require a player to place a wager sufficient to pay for five spins or handle pulls at a slot machine and complete five spins or handle pulls, with the prize to be provided to the player being determined based on the result of the five spins; in this example, the game play may comprise the five spins or handle pulls, beginning when the player places a sufficient wager for the five spins or handle pulls and ending when the player completes the final spin or handle pull.

The term "round of a game play" may refer to a step in a game play, necessary to successfully complete the game play; for example, if a game play consistent with embodiments of the present invention requires a player to complete five spins on a slot machine, each spin may be considered a round of the game play; similarly, if a video poker game play in accordance with embodiments of the present invention requires a player to complete five hands of video poker, each hand (e.g., final hand) may be considered a round of the game play.

The term "gaming device" may refer to any electrical, mechanical, electromechanical and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, pachinko machines, arcade games, video games, pinball machines, skill crane machines, video lottery terminals, online gaming systems, sports betting machines, game consoles, personal computers logged into online gaming sites, etc. Gaming devices may or may not be owned and/or maintained by a casino and/or may or may not exist within a casino location.

The term "gaming session" may refer to at least two consecutive game plays played by a player. The initiation of a gaming session, before a player plays at least two consecutive game plays, may be identified or inferred when a player's actions indicate that the player intends to play at least two consecutive game plays at the gaming device. Such actions may comprise, for example, the insertion of a player tracking card into a player tracking card reader of the gaming device or the insertion of currency into the payment system of gaming device in an amount sufficient to fund at least two game plays.

The term "outcome" may refer to an indication of the result of a round of a game play. An outcome typically comprises one or more symbols or alphanumeric characters recognizable by a player (such as "cherry-bell-seven" in a three reel slot machine). In many games a predetermined set of combinations of symbols each respectively corresponds to a payout.

The term "payout" may refer to an output of a prize (e.g., currency) to a player. A payout may be output to a player in the form of tangible coins or tokens (e.g., by being dispensed from a hopper into a coin tray of a gaming device). Alternatively, the output of currency may be in the form of electronic credits, which may be output by being added to a credit meter balance of a player.

The term "player" may refer to any person or entity that operates a gaming device for purposes of playing a game at the gaming device.

The term "player tracking card" may refer to any a device that is operable to identify and/or store information about a consumer who is a casino player. Typically player tracking cards may be accessed by gaming devices and magnetic card readers operated by casino staff. The information stored on the player-tracking card may include identifying information, as well as financial information, such as a number of gambling credits remaining. The card may be machine readable, for example, by a gaming device.

The term "privilege" may refer to an advantage, permission, or right granted to a player. For example, a privilege may allow a player to decrease the number of rounds or time required to complete a game play or to avoid an effect of an outcome (e.g., if the effect of the outcome is to decrease the balance of winnings for which the player is playing); in one or more embodiments a privilege may be associated with an outcome, such that the player may be granted the privilege if the player obtains the outcome corresponding to the privilege.

The scope of the present invention and embodiments thereof may be understood more fully with reference to the following figures. It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments", "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Regarding reference numerals used in the following figures, it should be noted that the left most digit(s) of a reference numeral identifies the figure in which the reference numeral first appears.

Embodiments of the present invention will first be introduced by means of a block diagram of an exemplary system infrastructure, followed by a description of block diagrams of exemplary devices that may be utilized by an entity practicing the present invention. Exemplary data structures illustrating tables that may be used when practicing embodiments of the present invention will then be described, followed by a flowchart that illustrates a method of the present invention.

Referring now to FIG. 1, a block diagram of a system 100 according to at least one embodiment of the present invention includes a gaming device 110 (e.g., a slot machine or video poker machine) that is in communication, via a communications network 115, with a casino server 120 (e.g., a slot server of a casino).

The gaming device 110 and/or the casino server 120 may comprise one or more computers, such as ones based on the Intel® Pentium® processor, that are adapted to communicate with one another. Any number and type of gaming devices 110 may be in communication with the gaming device server 120.

The gaming device 110 may communicate with the casino server 120 directly or indirectly, via a wired or wireless medium such as the Internet, LAN, WAN or Ethernet, Token Ring, or via any appropriate communications means or combination of communications means. Communication between the gaming device 110 and the casino server 120, and among a plurality of gaming devices 110, may be direct or indirect, such as over the Internet through a Web site maintained by casino server 120 on a remote server or over an on-line data network including commercial on-line service providers, bulletin board systems and the like. In yet other embodiments, a gaming device 110 may communicate with another gaming device and/or casino server 120 over RF, cable TV, satellite links and the like.

Some, but not all, possible communication networks that may comprise network 115 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the casino server 120 may not be necessary and/or preferred. For example, the present invention may, in one or more embodiments, be practiced on a standalone gaming device 110, a gaming device 110 in communication with a peripheral device (not shown) that is operable to aid in the implementation of one or more embodiments of the present invention and/or a gaming device 110 in communication only with one or more other gaming devices 110. In such an embodiment, any functions described as performed by the casino server 120 or data described as stored on the casino server 120 may instead be performed by or stored on one or more gaming devices 110 or on a peripheral device associated with a gaming device 110.

Figure 2:
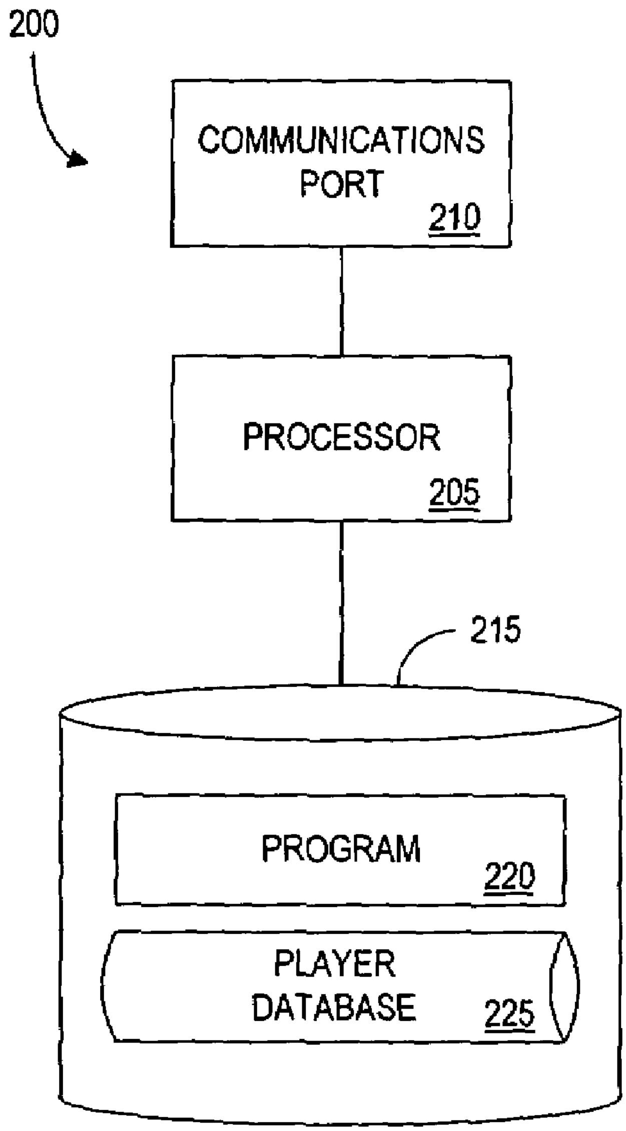
FIG. 2 is a block diagram of a casino server that may be part of the system of FIG. 1, consistent with at least one embodiment of the present invention.

Referring now to FIG. 2, illustrated therein is a block diagram of an embodiment 200 of a casino server (referred to as casino server 200 herein). The casino server 200 may be implemented as a system controller, a dedicated hardware circuit, an appropriately programmed general-purpose computer, or any other equivalent electronic, mechanical or electromechanical device. The casino server 200 may comprise, for example, a server computer operable to communicate with one or more client devices, such as a gaming device 110. In one or more embodiments, the casino server 200 comprises the casino server 120 of system 100. The casino server 200 is operative to manage portions of the system 100 and, in some embodiments, to execute at least some methods of the present invention.

In operation, the casino server 200 may function under the control of a casino, a merchant, or other entity that may also control use of one or more gaming devices 110. For example, the casino server 200 may be a slot server in a casino or a server that manages a specified set of gaming devices. In some embodiments, the casino server 200 and a slot server may be different devices. In some embodiments, the casino server 200 may comprise more than one computer operating together.

The casino server 200 comprises a processor 205, such as one or more Intel® Pentium® processors. The processor 205 is in communication with a communications port 210 (e.g., for communicating with one or more other devices) and a memory 215. The memory 215 may comprise an appropriate combination of magnetic, optical and/or semiconductor memory, and may include, for example, Random Access Memory (RAM), Read-Only Memory (ROM), a compact disc and/or a hard disk. The processor 205 and the memory 215 may each be, for example: (i) located entirely within a single computer or other device; or (ii) connected to each other by a remote communication medium, such as a serial port cable, telephone line or radio frequency transceiver. In one embodiment, the casino server 200 may comprise one or more devices that are connected to a remote server computer for maintaining databases.

The memory 215 stores a program 220 for controlling the processor 205. The processor 205 performs instructions of the program 220, and thereby operates in accordance with the present invention, and particularly in accordance with the methods described in detail herein. The program 220 may be stored in a compressed, uncompiled and/or encrypted format. The program 220 furthermore includes program elements that may be necessary, such as an operating system, a database management system and "device drivers" for allowing the processor 205 to interface with computer peripheral devices. Appropriate program elements are known to those skilled in the art, and need not be described in detail herein.

According to an embodiment of the present invention, the instructions of the program 220 may be read into a main memory from another computer-readable medium, such from a ROM to RAM. Execution of sequences of the instructions in program 220 causes processor 205 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 215 also stores a player database 225. This database is described in detail below. Note that, although this database is described as being stored in a casino server 200, in other embodiments of the present invention this database (or any other database described herein as being stored in casino server 200) may be partially or wholly stored in another device, such as in one or more gaming devices 110. Further, some or all of the data described as being stored in the database 225 may be partially or wholly stored (in addition to or in lieu of being stored in the memory 215 of the casino server 200) in a memory of one or more other devices, such as one or more gaming devices 110. In one or more embodiments, the casino server 200 may store additional databases. For example, the casino server 200 may store a gaming device database that includes information associated with one or more gaming devices in communication with casino server 200 (e.g., an identifier, contact address, and geographic location of a gaming device).

It should be noted that the term "computer-readable medium" as used herein refers to any medium that participates in providing instructions to processor 205 (or any other processor of a device described herein) for execution. Such a medium may take many forms, including but not limited to, non-volatile media, volatile media, and transmission media. Non-volatile media include, for example, optical or magnetic disks, such as memory 215. Volatile media include dynamic random access memory (DRAM), which typically constitutes the main memory. Transmission media include coaxial cables, copper wire and fiber optics, including the wires that comprise a system bus coupled to the processor 205. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 205 (or any other processor of a device described herein) for execution. For example, the instructions may initially be borne on a magnetic disk of a remote computer. The remote computer can load the instructions into its dynamic memory and send the instructions over a telephone line using a modem. A modem local to a casino server 200 can receive the data on the telephone line and use an infrared transmitter to convert the data to an infrared signal. An infrared detector can receive the data carried in the infrared signal and place the data on a system bus for processor 205. The system bus carries the data to main memory, from which processor 205 retrieves and executes the instructions. The instructions received by main memory may optionally be stored in memory 215 either before or after execution by processor 205. In addition, instructions may be received via communication port 210 as electrical, electromagnetic or optical signals, which are exemplary forms of carrier waves that carry data streams representing various types of information. Thus, the casino server 200 may obtain instructions in the form of a carrier wave.

Figure 3:
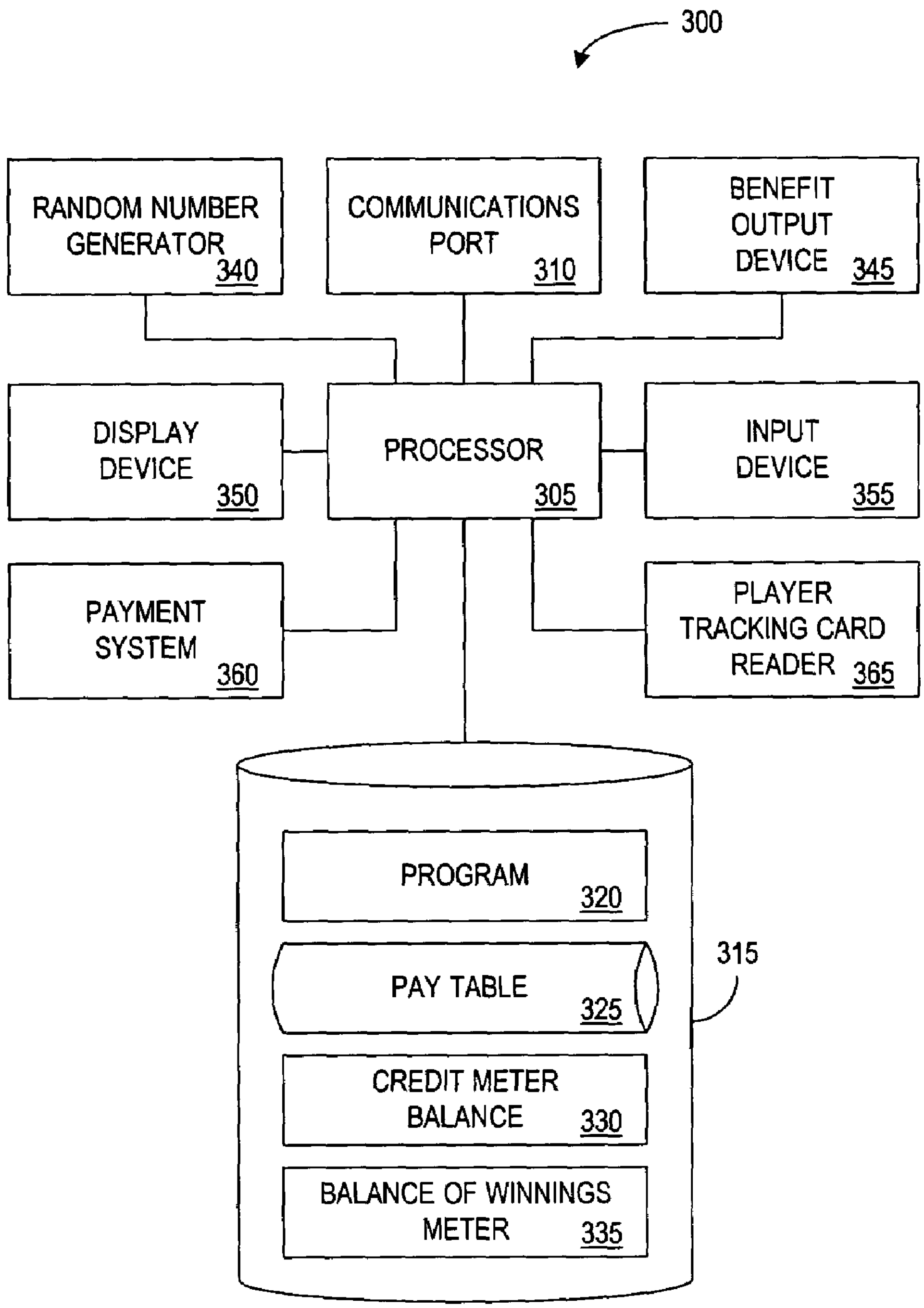
FIG. 3 is a block diagram of a gaming device that may be part of the system of FIG. 1, consistent with at least one embodiment of the present invention.

Referring now to FIG. 3, illustrated therein is a block diagram of an embodiment 300 of a gaming device (referred to as gaming device 300 herein). The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine or a tabletop game. In various embodiments, a gaming device 300 may comprise, for example, a personal computer (e.g., which communicates with an online casino Web site), a telephone (e.g., to communicate with an automated sports book that provides gaming services), or a portable handheld gaming device (e.g., a personal digital assistant or Nintendo GameBoy). The gaming device 300 may comprise the gaming device 110 of system 100 (FIG. 1). In some embodiments, a user device such as a PDA or cell phone may be used in place of, or in addition to, some or all of the gaming device 300 components depicted in FIG. 3. Further, a gaming device 300 may comprise a personal computer or other device operable to communicate with an online casino and facilitate game play at the online casino. In one or more embodiments, the gaming device 300 may comprise a computing device operable to execute software that simulates play of a reeled slot machine game, video poker game, video blackjack game, video keno game, video roulette game, or lottery game.

The gaming device 300 comprises a processor 305, such as one or more Intel® Pentium® processors. The processor 305 is in communication with a communications port 310 (e.g., for communicating with one or more other devices) and a memory 315. The memory 315 may comprise an appropriate combination of magnetic, optical and/or semiconductor memory, and may include, for example, Random Access Memory (RAM), Read-Only Memory (ROM), a compact disc and/or a hard disk. The memory 315 may comprise or include any type of computer-readable medium. The processor 305 and the memory 315 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The memory 315 stores a program 320 for controlling the processor 305. The processor 305 performs instructions of the program 320, and thereby operates in accordance with the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment of the present invention, the instructions of the program 320 may be read into a main memory from another computer-readable medium, such from a ROM to RAM. Execution of sequences of the instructions in program 320 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 315 also stores a payout database 325. Embodiments of the payout database 325 are described in detail below.

Note that, although the payout database 325 is described as being stored in a gaming device 300, in other embodiments of the present invention some or all of this database may be partially or wholly stored in another device, such as the casino server 120. Further, some or all of the data described as being stored in the payout database 325 may be partially or wholly stored (in addition to or in lieu of being stored in the memory 315 of the gaming device 300) in a memory of one or more other devices, such as that of casino server 120.

The payout database 325, as well as the player database 225, is described in detail below and an example structure of each database is depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The memory 315 also stores a credit meter balance 330 (which stores the amount of electronic credits that a player currently has available for wagering and/or cash out) and a winnings balance 335 that stores the current amount of winnings that a player is entitled to for a particular game play. In one or more embodiments, the memory 315 may also store additional information. For example, the memory 315 may store an amount of coins currently available in a hopper of the gaming device 300.

The processor 305 is also operable to communicate with a random number generator 340, which may be a component of gaming device 300. The random number generator 340, in accordance with at least one embodiment of the present invention, may generate data representing random or pseudo-random values (referred to as "random numbers" herein). The random number generator 340 may generate a random number, for example, every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 305. Alternatively, random number generator may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 is also operable to communicate with a benefit output device 345, which may be a component of gaming device 300. The benefit output device 345 may comprise one or more devices for outputting a benefit to a player of the gaming device 300.

For example, in one embodiment the gaming device 300 may provide coins and/or tokens as a benefit. In such an embodiment the benefit output device 345 may comprise a hopper and hopper controller, for dispensing coins and/or tokens into a coin tray of the gaming device 300.

In another example, the gaming device 300 may provide a receipt or other document on which there is printed an indication of a benefit (e.g., a cashless gaming receipt that has printed thereon a monetary value, which is redeemable for cash in the amount of the monetary value). In such an embodiment the benefit output device 345 may comprise a printing and document dispensing mechanism.

In yet another example, the gaming device 300 may provide electronic credits as a benefit (which, e.g., may be subsequently converted to coins and/or tokens and dispensed from a hopper into a coin tray). In such an embodiment the benefit output device 345 may comprise a credit meter balance and/or a processor that manages the amount of electronic credits that is indicated on a display of a credit meter balance. The processor may be the processor 305 or another processor.

In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device 345 may comprise a device for communicating with a server on which the financial account is maintained.

Note that, in one or more embodiments, the gaming device 300 may include more than one benefit output device 345 even though only one benefit output device is illustrated in FIG. 3. For example, the gaming device 300 may include both a hopper and hopper controller combination and a credit meter balance. Such a gaming device may be operable to provide more than one type of benefit to a player of the gaming device.

A single benefit output device 345 may be operable to output more than one type of benefit. For example, a benefit output device 345 may be operable to increase the balance of credits in a credit meter and communicate with a remote device in order to increase the balance of a financial account associated with a player.

The processor 305 is also operable to communicate with a display device 350, which may be a component of gaming device 300. The display device 350 may comprise, for example, one or more display devices or areas of a display device for outputting information related to game play on the gaming device. A display device 350 may comprise, for example, a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays rotating mechanical reels.

The processor 305 may also be in communication with one or more other devices besides the display device 350, for outputting information (e.g., to a player or another device). Such other one or more output devices may also be components of gaming device 300. Such other one or more output devices may comprise, for example, an audio speaker, an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device 350 may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). In yet another of the display areas, a credit meter balance of the player may be displayed. In yet another of the display areas, marketing messages may be displayed to the player (e.g., offers for benefits in exchange for activities or commitments to be performed by the player). In one or more embodiments, the gaming device 300 may include more than one display device, one or more other output devices, or a combination thereof (e.g., two display devices and two audio speakers).

The processor 305 is may also be operable to communicate with an input device 355, which is a device that is capable of receiving an input (e.g., from a player or another device) and which may be a component of gaming device 300. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 may also be operable to communicate with a payment system 360, which may be a component of gaming device 300. The payment system 360 is a device capable of accepting payment from a player (e.g., a bet or initiation of a balance). Payment is not limited to currency, but may also include other types of consideration, including products, services, and alternate currencies (e.g., comp points). Currency, as used herein, includes coins, bills and tokens, as well as cashless gaming receipts and electronic currency (e.g., transfers from a bank, such as a credit card issuer, or e-cash™).

Exemplary methods of accepting payment by the payment system 360 include (i) receiving hard currency (i.e., coins or bills), and accordingly the payment system 360 may comprise a coin or bill acceptor; (ii) receiving an alternate currency (e.g., a paper cashless gaming voucher, a coupon, a non-negotiable token), and accordingly the payment system 360 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

The processor 305 is also operable to communicate with a player tracking card reader 365, which may be a component of gaming device 300. Player tracking card reader 365 may be a device that may be capable of identifying and/or storing information about a player of gaming device 300. Typically player-tracking cards may be accessed by gaming devices and magnetic card readers operated by casino staff. The information stored on the player-tracking card may include identifying information, as well as financial information, such as a number of gambling credits remaining. The card may be machine readable, for example, by a gaming device.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 4:
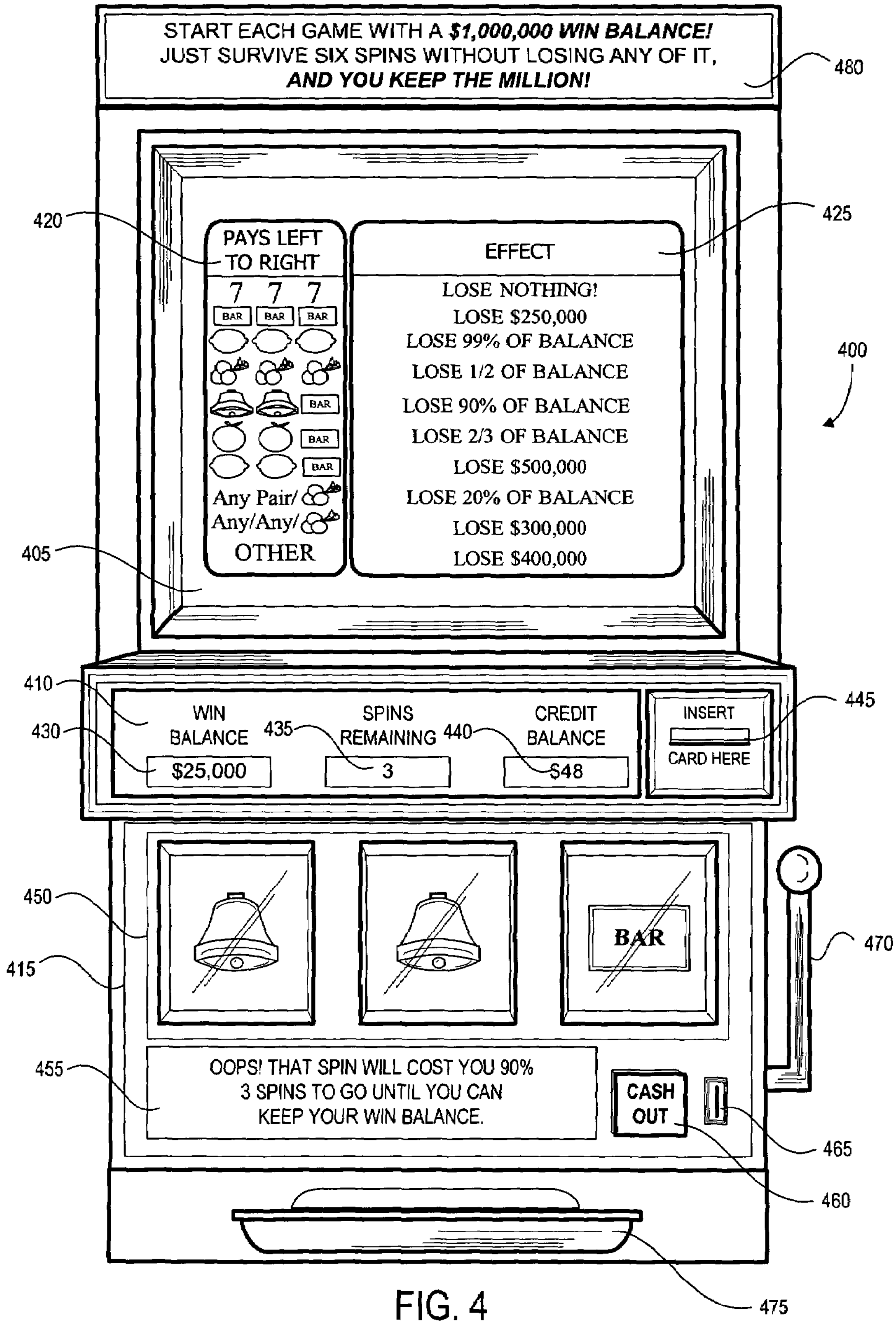
FIG. 4 is a plan view of a gaming device, consistent with at least one embodiment of the present invention.

Referring now to FIG. 4, an embodiment 400 of a plan view of an exemplary gaming device 110 is illustrated. In the embodiment 400 of gaming device 110 (referred to as gaming device 400 herein), the gaming device comprises a three-reel slot machine. The gaming device 400 comprises a first portion 405, a second portion 410, and a third portion 415.

The first portion 405 includes a display of a payout table consistent with one or more embodiments of the present invention. The payout table includes a plurality of outcomes 420, each outcome corresponding to an effect 425. Each effect 425 comprises an effect on a balance of winnings. For example, one of the effects is "lose ½ of balance." This effect corresponds to an outcome of "cherry-cherry-cherry". Thus, when a player obtains an outcome of "cherry-cherry-cherry", the effect of "lose ½ of balance" is applied to the player's current balance of winnings. For example, if the player's balance of winnings was $500,000 immediately before the player obtained the outcome of "cherry-cherry-cherry", that balance would be reduced to $250,000 once the player obtained the outcome. It should be noted that the payout table may be displayed, for example, on an electronic display or on painted "belly glass", as would be recognized by one of ordinary skill in the art.

The second portion 410 comprises (i) a display 430 for displaying a player's current balance of winnings (i.e., a display of the balance of winnings meter 335), (ii) a display 435 for displaying a number of spins (or rounds of the game) that the player must complete before qualifying to receive a final balance of winnings, (iii) a display 440 for displaying a player's current credit meter balance, and (iv) a player tracking card reader 445 for accepting a player tracking card.

It should be noted that a display of a gaming device for displaying a balance of winnings such as display 430 may have in its proximity a text disclaimer indicating that the balance of winnings cannot be cashed out or otherwise redeemed so long as there are still any rounds remaining in a game play. A disclaimer may also be broadcast via a speaker of the gaming device. With the use of disclaimers, a player may be less likely to mistakenly believe that he can cash out a million-dollar balance of winnings before a game play has been finished. In one or more embodiments, a number of rounds remaining in a game play may be displayed to a player on one or more reels or other display areas of the gaming device.

It should be noted that in the embodiment depicted in FIG. 4, a game play comprises a predetermined number of rounds of a game that the player must complete before qualifying for the final balance of winnings. As described herein, in other embodiments a game play may comprise a predetermined amount of time that a player must initiate rounds of the game for in order to qualify for the final balance of winnings. In such an embodiment, the display 435 may display a "time remaining" rather than a number of spins remaining. In one embodiment, a player must initiate rounds of the game for a predetermined amount of time and at a minimum predetermined rate of play (e.g., five spins per minute). In such an embodiment, the display 435 or another display may also display to the player the current rate of play, a comparison of the current rate of play to the minimum predetermined rate of play, and/or an indication of whether the current rate of play is at least equal to the minimum predetermined rate of play. It should be noted that the credit meter balance is distinct from the balance of winnings. It should further be noted that, if the gaming device 400 was a video poker machine, the display 435 might indicate a number of final "hands" remaining rather than a number of "spins" remaining.

The third portion 415 includes (i) a display 450 for displaying the outcome achieved by a player, (ii) a display 455 for outputting messages to a player, (iii) a cash out button 460, (iv) a payment system 465 via which a player may input coins or tokens for wagers on the gaming device 400; (v) a handle 470 for initiating a round of the game playable on gaming device 400, and (vi) a coin tray 475 via which coins and/or tokens may be output to the player (e.g., in response to the player actuating the cash out button 460).

The gaming device 400 also comprises a display 480 that displays the rules of the game. As can be seen, the display 480 indicates that a player can win an initial balance of winnings equaling $1,000,000 if the player initiates six rounds of the game and does not lose any of this initial balance of winnings during the six rounds. For example, if a player were to obtain the outcome "7-7-7" six times in a row, the player would win the initial balance of winnings of $1,000,000. Otherwise, as the rule displayed on display 480 indicates, at the end of the six rounds the player wins whatever the final balance of winnings is.

For example, assume a player obtained the outcome "cherry-cherry-cherry" for the first round of a game play. The player's initial balance of winnings would be decreased from $1,000,000 to $500,000 (since the outcome "cherry-cherry-cherry" corresponds to the effect "lose ½ of balance" and ½ of $1,000,000 is $500,000. Assume further that the outcome for the second round was "bar-bar-bar". As a result of this outcome, the current balance of winnings as displayed in the display 430 would be decreased to $250,000 (since the effect corresponding to the outcome "bar-bar-bar" is "lose $250,000" and $500,000 less $250,000 is $250,000). Assume further that the player then obtained, for the third round, the outcome "bell-bell-bar". As a result of this outcome, the current balance of winnings as displayed in display 430 would be decreased to $25,000 (since the effect corresponding to the outcome "bar-bar-bell" is "to lose 90% of the balance", 90% of $250,000 is $225,000, and $250,000 less $225,000 is $25,000). Assume further still that the outcome for the fourth round was "7-7-cherry", which qualifies as an "any pair-cherry" outcome. As a result of this outcome, the balance of winnings would be reduced to $20,000 (since the outcome "any pair-cherry" corresponds to an effect of "lose 20% of the balance", 20% of $25,000 is $5,000, and $25,000 less $5,000 is $20,000). Assuming that the outcome obtained for the fifth round was "lemon-lemon-lemon". The current balance of winnings would be reduced to $200 (since the effect corresponding to the outcome of "lemon-lemon-lemon" is "lose 99% of balance", 99% of $20,000 is $19,800, and $20,000 less $19,800 is $200). Finally, for the sixth and last round of the game play, assume that the player obtained the outcome "bell-bell-bar". As a result of this outcome, the final balance of winnings would be set to $20 (since the effect corresponding to the outcome "bell-bell-bar" is "lose 90% of balance", 90% of $200 is $180 and $200 less $180 is $20). Accordingly, in the current example, at the end of six rounds the player would be provided with a final balance of winnings equaling $20. For example, $20 worth of electronic credits could be added to the player's credit balance or $20 worth of casino tokens could be dispensed to the player via the coin tray 455.

Note that the gaming device 400 may include different and/or additional components besides those illustrated in FIG. 4 and may not necessarily include each of the components illustrated in FIG. 4. For example, the gaming device 400 may include a display indicating the wager amount necessary for initiating a game play at the gaming device.

Referring now to FIG. 5, an exemplary tabular representation 500 illustrates an embodiment of a player database 225, such as may be stored in the memory of a casino server 120. The tabular representation 500 of the player database includes a number of example records or entries, each defining a player registered with the entity practicing the present invention. Those skilled in the art will understand that the player database 500 may include any number of entries.

The tabular representation 500 also defines fields for each of the entries or records. The fields specify: (i) a player identifier 505 that uniquely identifies a player, (ii) a name 510 of a player, (iii) an address 515 associated with the player, (iv) a financial account identifier 520 associated with a player, (v) demographic information 525 that stores demographic information associated with the player, (vi) available privileges 530 that stores an indication of one or more privileges that a player has available for use in one or more rounds of a game; (vii) a lifetime coin-in 535 that indicates an amount of wagers placed by the player within a predetermined period of time (e.g., since the player's wagers have begun to be tracked, and (viii) a theoretical win/[loss] 540 associated with the player.

The information in the player database 500 may be created and updated, for example, based on information received from a player, a casino employee, a gaming device 110, a casino server 120, and/or another device. For example, the information may be created when a player registers with a casino and receives a player-tracking card encoded with the player identifier. The information may be subsequently updated when a player requests to update the information (e.g., when a player indicates a desire to change a preferred character or preferred method of outputting an outcome) or when additional information is obtained about the player via the casino's interactions with the player (e.g., the lifetime theoretical win may be updated on an ongoing basis as the player plays games at a casino).

The player identifier 505 may be, for example, an alphanumeric code associated with a player who may operate a gaming device or play a table game at a casino. The player identifier 505 may be generated or selected, for example, by the casino server 120 or by the player (e.g., when a player first registers with a casino). In some embodiments, a player tracking card number of a player-tracking card provided to a player may be distinct from a player identifier. In such embodiments, an additional field for the player tracking card number may be included in player database 500.

For each player, the player database 500 may also store the player's name 510 (e.g., for use in outputting messages to the player). In one or more embodiments the player's name may comprise a nickname or other designation for the player that is selected by the player or the casino. In one or more embodiments, the nickname may comprise a designation that reflects the player's status (e.g., "premium player"). Such a status may indicate, for example, the typical spending range of the player or other indication of how valuable the player is considered to be by the casino. Such a designation may or may not be known to the player.

The address 515 stores an address that may be used to contact a player. Such an address may comprise, for example, a home postal mailing address, an electronic mail (e-mail) address, and/or an address of a portable device at which the player may receive messages. For example, in one embodiment a player may be associated with a Bluetooth™-enabled device. In such an embodiment, the Bluetooth™ address (often referred to as the BD_ADDR) of that device may be stored in address field 515. The Bluetooth™ address of a Bluetooth™-enabled device is a 12-character code that can usually be found on the device such as near the device's serial number. In another example, the address field 515 may be an IP address of the device. Note that more than one address or type of address may be stored in the address field 515.

The financial account identifier 520 (e.g., a credit card account number, a debit card account number, a checking account number, a casino financial account number, or digital payment protocol information) identifies a financial account associated with the player. The financial account identifier 520 may be used, for example, to credit a payment to the player (e.g., wherein a benefit obtained by the player comprises a monetary amount) and/or to debit a wager amount. For example, if, in response to a message output to a player, the player agrees to perform an activity in exchange for a payment, the payment may be credited to the financial account by use of the financial account identifier associated with the player.

The demographic information field 525 stores various demographic information associated with a player. For example, the player's gender, age, income level, and occupation may be stored. Additional information about the player's interests and hobbies may also be stored. Such information may be utilized, for example, to select and/or customize messages and/or bonuses presented to the player. Such information may be provided by a player, for example, when the player registers with the casino or via a survey answered by the player at another time.

The available privileges field 530 stores an indication of any privileges that a player may have obtained and that are still available for use by the player. As discussed herein, in one or more embodiments an outcome obtained by a player during a game play may correspond to a privilege that grants special advantages or permissions to the player. In some embodiments, such a privilege may be usable by a player at the player's discretion or when the player otherwise qualifies to use the privilege. In such embodiments, a privilege granted by a player may be associated with the player by being stored in association with the player identifier in the player database 500. Accordingly, the player's record in the database may be checked as appropriate to determine whether the player has an available privilege. Note that the privileges are illustrated as being described in text that describes the effect of each privilege. In other embodiments, each privilege may be associated with a unique identifier and the identifier may be stored in the player database 500. Further note that some privileges may have restrictions associated therewith. For example, a privilege may only be usable at certain times, at a particular gaming device or type of gaming device, or in a particular game. Any such restrictions on the use of a privilege may be stored in association with the privilege in the player database 500. In other embodiments, if only a privilege identifier is stored in the player database 500, another database may store additional details about the privileges available to players (including any restrictions associated therewith and the effect of the privilege). In such embodiments, the privilege identifier may be retrieved from the player's record in the player database and the additional details associated with the privilege may be retrieved from this other database based on the privilege identifier.

Exemplary privileges that may be provided to a player include the following:

(i) A privilege may allow a player to void the effect of an outcome obtained by a player, without requiring the player to complete another round and thus obtain a replacement outcome. Thus, for example, if the effect of an outcome caused a reduction in the current balance of winnings from 100 to 10 coins, the privilege (when exercised) would result in the balance of winnings being restored to 100 coins.

(ii) A privilege may allow a player to avoid the effect of an outcome obtained during a round of a game play, but require the player to complete another round in order to obtain a replacement outcome.

(iii) A privilege may allow a player to avoid completing one or more rounds before finishing a game play, but only before the player obtains the outcome of the round. Thus, for example, a player who had two out of three spins remaining in a game play in a reel slot machine may now finish the game play after having completed only one or more spins.

(iv) A privilege may allow a player to avoid completing all remaining rounds in a game play, thus effectively decreasing the number of rounds required for successful completion of the game play. In one or more embodiments, such a privilege may be associated with a constraint that limits its use to game plays in which a player has a number of rounds remaining in the game play that is less than or equal to a predetermined number.

(v) A privilege may allow a player to guarantee that a current balance of winnings will not be reduced from its present level by the end of a game play or will not be reduced by more than a specified amount or percentage. In games where all possible outcomes have an associated effect that causes a balance of winnings to be decreased, such a privilege may have the same effect as a privilege that allows a player to avoid completing all remaining rounds in a game play.

(vi) A privilege may allow a player to lessen the severity of an effect associated with an outcome. For example, a privilege may allow a player to limit the reduction in the player's balance of winnings to only half of what the reduction would otherwise be. For example, if the effect of the outcome is to reduce the current balance of winnings by 1,000 coins, then by exercising the privilege the player may limit the reduction to 500 coins. Or, in another example, if the effect of the outcome is to reduce the current balance of winnings by 50%, then by exercising the privilege the player may limit the reduction to 25%. In another example of this type of privilege, a player may be allowed to limit his losses on a given round to a predetermined level. For example, the privilege may provide that a current balance of winnings is to be reduced by a maximum amount (e.g., 10,000 coins) or percentage (e.g., 10%) as a result of a given outcome.

(vii) A privilege may allow a player to restore a balance of winnings to its level at some prior point in the game play. For example, a player may restore a win balance to its initial level, even though he may be on his fourth round in a game play. Alternatively, a player might be limited to restoring a balance of winnings only to the level it was at in a predetermined round or within a predetermined number of rounds prior to the exercise of the privilege (e.g., the level it was in the round immediately prior to the round in which the privilege is exercised). In one or more embodiments, a player may be able to increase his balance of winnings to a level above that of its initial level.

(viii) A privilege may allow a player to terminate a game play immediately and receive the current balance of winnings, without having to complete any additional rounds of the game play. For example, such a privilege may be granted to the player upon the occurrence of a special "cashout" symbol in an outcome of the gaming device. The symbol may depict, for example, the coin tray of a gaming device, or may show an actual button with the word "cashout" on it.

(ix) A privilege may allow a player to terminate a game play immediately and receive consideration, but requiring the player to settle for a lesser amount than the current balance of winnings. For example the player might be required to settle for 10% (or another specified percentage) of the current balance of winnings or for the current balance of winnings less 100 coins (or another specified amount).

(x) A privilege may allow a player increase a current balance of winnings. For example, such a privilege may allow a player to double or triple a balance of winnings or to add a specified amount or percentage to the current balance of winnings.

(xi) A privilege may allow a player to reduce an amount of time remaining in a game play. For example, in accordance with one embodiment a game play may require a player to play rounds of the game for a predetermined amount of time. In such an embodiment this privilege may allow that predetermined period of time to be reduced (e.g., by a predetermined amount or by a predetermined portion of an amount of time remaining in the game play at the time the privilege is exercised).

(xii) A privilege may allow a player to reduce a minimum rate of play required in a game play. For example, in accordance with one embodiment a game play may require a player to play rounds of a game for a predetermined amount of time and at a predetermined minimum rate. In such an embodiment this privilege may allow that predetermined minimum rate to be reduced (e.g., by a predetermined amount or to a predetermined level).

In one or more embodiments, a privilege may have one or more restrictions or conditions associated therewith. For example, a privilege may have an expiration condition associated therewith, such that the privilege may only be exercised within a predetermined amount of time from the time at which it is obtained or within a predetermined number of rounds from the round in which it is obtained. In another example, a privilege may only be exercised within a particular game, game play, or round of a game play, or on a particular gaming device or type of gaming device. In yet another example, a privilege may only be exercisable during a particular period of time or if another specified condition is satisfied. In yet another example, a privilege may be exercisable until a condition is satisfied.

In one or more embodiments, a privilege may only be exercised a single time. In other embodiments a privilege may be exercisable a plurality of times (e.g., three times or until a specified condition is satisfied). For example, a player who obtains a particular privilege may have the option of exercising the privilege five times in the same game play, or may be limited as to the number of times per game play that the privilege may be exercised.

In one or more embodiments, a privilege may be exercised in response to a command to do so from the player. For example, when a player obtains a privilege as a result of an outcome, the player may choose to exercise the privilege for the current round or to save the privilege for use in a subsequent round (or both, if the particular privilege is exercisable more than once). In other embodiments, a privilege may be exercised automatically for a player, without a command from the player to do so. For example, a privilege may be exercised automatically at the time it is obtained, for the round in which it is obtained or for the next round. In another embodiment, if a privilege has associated therewith a condition restricting when the privilege may be exercised, the privilege may automatically be exercised at the time the condition is satisfied.

In one or more embodiments, any privileges available to a player may be displayed for the player so that he may more easily remember which privileges are available to him. For instance, if a player has obtained an outcome conferring a "cancel a spin" privilege, the player's gaming device may display an icon on a display screen showing a picture of a three reels with a line through them. When the player wishes to exercise the privilege to cancel a spin, the player may simply touch the icon. Of course, privileges may be displayed in many other forms, such as in the form of text, or in the form of LEDs, each of which may be lit to indicate a different privilege.

In one or more embodiments, a player may purchase or otherwise earn a privilege. For example, in one embodiment a player may receive a privilege in return for a commitment or agreement. To receive the privilege, the player may be required to accept an offer presented to him. In return for the privilege, the player may commit to do one or more of the following:

(i) answer survey questions;
(ii) provide an opinion about a product or service;
(iii) monitor the feeds from security cameras;
(iv) make a purchase of a product or service from the casino or another entity;
(v) do business with a third-party merchant (e.g., a player might commit to sign up for a merchant's credit card);
(vi) refer the casino, a third-party merchant, or a product or service to a friend;
(vii) provide advice, such as legal, medical, or financial advice;
(viii) perform any other form of work;
(ix) try or agree to try in the future a product or service.

In one or more embodiments, an offer for a privilege might be output to a player after the player obtains an outcome the effect of which substantially reduces a current balance of winnings associated with the player. An offer for a privilege may be output via visual or audio means.

For example, the casino server 120 may, in one or more embodiments, store potential offers in a database (not shown). The casino server 120 may further monitor play at the player's gaming device 110 by, for example, receiving outcome information from the gaming device 110 via a network (such as network 115). If events at the gaming device 110 satisfy one or more predetermined criteria, the casino server 120 may determine an appropriate offer based on the criteria and cause the offer to be output to the player.

Returning now to the description of FIG. 5, the lifetime coin in field 535 stores an indication of the sum of wagers placed by the player over a predetermined period of time. For example, the lifetime coin in may represent the sum of wagers placed by a player at gaming devices since the player first registered with the casino. Such information may be useful, for example, in determining whether a player should be accorded a special status and thus provided with certain benefits. For example, if a player's coin in is above a predetermined threshold, any privileges associated with the player may not expire or may not expire as soon as they otherwise would.

The theoretical win/[loss] 540 stores an indication of the theoretical win of the casino based on the playing activity of the player since the playing activity of the player has been tracked. In other words, the theoretical win/[loss] 540 may be a "lifetime" theoretical win. In other embodiments a theoretical win/[loss] based on other periods of time may be stored in addition to or instead of the lifetime historical theoretical win/[loss]. For example, an annual, session, or trip theoretical win/[loss] may be stored.

It should be understood that although a player identifier and information related to each registered player is described in detail, a player need not be registered in order to obtain benefits of the present invention (e.g., receive messages offering benefits based on information derived from the gaming device being played by the player). Accordingly, registration of a player and storing of information related to a player is not necessary for practice of the present invention.

The player database 500 may be utilized by a casino server 200, for example, to retrieve information about players in order to facilitate the output of messages and/or the provision of a benefit to a player. For example, the player's name may be retrieved from the player database for incorporation into the message to be output to the player. In another example, the address of the player device associated with the player may be retrieved for use in outputting the message to the player. In yet another example, the financial account identifier associated with the player may be retrieved for use in crediting a benefit to the player.

In one or more embodiments, the player database 500, or some or all of the data described as being stored therein, may be stored in a device other than the casino server 200. For example, the player database 500 may be stored in a gaming device 110 and/or another device. In another example, a record of a player as would be stored in the player database 500 may additionally or alternately be stored on a player tracking card that a player inserts into a gaming device.

Referring now to FIG. 6, an exemplary tabular representation 600 illustrates an embodiment of a payout table 325, such as may be stored in the memory of a gaming device 300. The tabular representation 600 of the payout table 325 includes a number of example records or entries, each defining an outcome that may be obtained by a player of the gaming device 300. Those skilled in the art will understand that the payout table 600 may include any number of entries.

The tabular representation 600 also defines fields for each of the entries or records. The fields specify: (i) an outcome 605, (ii) an effect 610 that corresponds to the outcome, and (iii) a probability 615 of the outcome being obtained by a player.

The payout table 600 may be utilized by a gaming device 300, for example, to determine how a current balance of winnings is to be adjusted based on an outcome obtained by a player for a round of a game. For example, if an outcome of "bar-bar-bar" is obtained for a round of a game and the current balance is $300,000, the gaming device may determine, based on the payout table 600, that the current balance of winnings should be adjusted to be $100,000 (since the outcome "bar-bar-bar" corresponds to an effect of dividing the balance of winnings by three and $300,000 divided by three is $100, 000).

It should be noted that payout table 600 is designed for use in a game where a player begins with a win balance of $1,000, and completes five rounds in order to complete a game play. In the exemplary payout structure illustrated, the balance of winnings can never go below zero. Numerous such game plays were simulated on a computer, and the expected balance of winnings following the fifth round of a game play was experimentally determined to be approximately 0.9 credits. Therefore if a player were to place a wager of one coin for a game play, the casino may be expected to win an average of 0.1 coin per game play.

It should be noted that, in one or more embodiments, the fact that a gaming device is operable to apply effects of outcomes that cause a balance of winnings to be decreased may be clearly and prominently displayed, e.g., with a lit sign on top of the gaming device, to avoid or minimize confusion on a player's part.

It should further be noted that, although the effects depicted in FIG. 6 each cause a balance of winnings to be decreased or, at most, remain unchanged, in some embodiments of the present invention at least one outcome obtainable for a game play may correspond to an effect that causes the balance of winnings to be increased. For example, an effect may be to restore the balance of winnings to a prior balance of winnings, to multiply the balance of winnings by an integer greater than zero or by a percentage greater than one hundred percent, or to add a constant to the balance of winnings.

Although a balance of winnings has been described with respect to FIG. 6 as representing an amount of currency, a balance of winnings may represent a value of many other types of prizes. Further, although the effects of outcomes have been illustrated in FIG. 6 in terms of a reduction in an amount of currency, in one or more embodiments an effect may be in the form of a reduction in another type of prize, as appropriate. Exemplary types of prizes that a win balance may represent and the different forms that effects can take are described in detail below.

In one embodiment, a balance of winnings may represent a level of a comp to be provided a player at the end of a game play. For example, the highest level of a balance of winnings may be a one-night stay in a hotel suite. From this highest level, the balance of winnings may be reduced to a deluxe room, to a standard room, and then to nothing, based on different effects associated with outcomes.

In one embodiment, a balance of winnings may progress from an initial top prize of a gourmet dinner for four people, to a gourmet dinner for two people, to a steakhouse dinner for four people, to a steakhouse dinner for two people, and finally to nothing.

In one embodiment, a balance of winnings may represent the portion of a player's bill for which he is responsible following his stay at a casino resort. For example, at its initial and highest level, the balance of winnings may be set to indicate that the player is not responsible for any portion of his bill. In other words, his whole stay will be free. However, various effects of outcomes obtainable by the player may cause the balance of winnings to be reduced to lower levels of prizes. For example, if the win balance is reduced to its next highest level, then the player may be responsible only for his food bill. As the level of the balance of winnings continues to decline, the player may become responsible for his beverage bill, his spa bill, his phone bill, his premium television bill, and finally his entire bill, including room bill.

In one embodiment, a balance of winnings may represent a prize such as a product or service, with higher balances of winnings representing more valuable products or services. For example, a balance of winnings may start out representing a house. As the balance of winnings declines, it may represent, in turn, a boat, a car, a set of golf clubs, a power drill, a blender, and finally, nothing. In another progression, a win balance may at its highest and initial level represent a diamond necklace, then a diamond bracelet, then diamond earrings, and finally nothing.

In one embodiment, a balance of winnings may represent an amount or quantity of a product or service to be made available to the player. For example, an initial balance of winnings may be a one-year membership to a particular organization. As the balance of winnings declines, it may represent, in turn, a nine month membership, then a six month membership, and so on. As another example, a balance of winnings may first represent a two-year subscription to a magazine, then a one-year subscription, then a six-month subscription, etc.

In one embodiment, a balance of winnings may represent a jackpot or other payout that will be made available to a player as a potential prize at a subsequent time. For example, a player might begin a session at a gaming device by playing a game play according to the methods of the present invention (e.g., as a preliminary step towards beginning conventional play at the gaming device). In some embodiments, the player may not even be required to place a wager for this preliminary game play. The balance of winnings at the end of the preliminary game play may then becomes the jackpot prize for the gaming device when it is played using conventional methods. For example, if the player finished his preliminary game play with a balance of winnings equaling $350,000, and subsequently, during conventional game play, obtains an outcome that corresponds to the jackpot prize, the player would win $350,000. In contrast, if the player had finished the preliminary game play with a final balance of winnings equaling $350,000, but did not subsequently during conventional game play obtain the outcome that corresponds to the jackpot prize, then the $350,000 would not have been provided to the player (although it may have had psychological influence on his play).

In another variation of the above embodiment, the initial balance of winnings for the preliminary game play (the game play played according to embodiments of the present invention) may represent the top prize in the conventional game to follow, the balance of winnings following the first round of the preliminary game play may represent the second highest prize in the game to follow, the balance of winnings following the second round in the preliminary game play may represent the third highest prize in the conventional game play to follow, and so on. In this way, the preliminary game play serves to at least partially generate a pay table that will be used in subsequent conventional game plays. In some embodiments, the player may be required to pay to play the preliminary game play. The player may thus be discouraged from repeatedly starting a new preliminary game play in order to create the highest possible jackpot prize for himself. Alternatively or additionally, the player may only be allowed to play a preliminary game play in accordance with embodiments of the present invention after he has played a predetermined number of conventional game plays (perhaps over a predetermined duration of time or within a single game session). In this way, the player must at least pay to play several conventional game plays every time he desires to generate a new jackpot level or other prize level for the conventional game play. Another alternative would restrict the number of times per unit of time that a player could play a preliminary game play in accordance with embodiments of the present invention. For example, the player might be limited to playing twice per day.

It should be noted that a balance of winnings might be displayed as a number or other symbol, with each distinct number or symbol corresponding to a prize or other non-numeric item. For example, the number "5" may represent a platinum necklace, the number "4" may represent a gold necklace, and the number "3" may represent a silver necklace. Alternatively a balance of winnings may be displayed as an actual description of a prize. For instance, a balance of winnings may be displayed as "platinum necklace" or "gold necklace". A balance of winnings may even be displayed as a graphic (e.g., a graphic depicting the prize or a level of a prize).

In one or more embodiments, more than one prize may correspond to a value represented by a balance of winnings. For example, a first group of prizes may correspond to a first value represented by a balance of winnings, a second group of prizes may correspond to a second value represented by a balance of winnings, and a third group of prizes may correspond to a third value represented by a balance of winnings. In such embodiments, when a final balance of winnings is determined at the end of a game play, a player may be provided with an opportunity to select which prize of the group of prizes corresponding to the value represented by the final balance of winnings the player would like to be provided with.

In one or more embodiments, a casino may employ revenue management principles to determine which prizes correspond to which values represented by a balance of winnings. For example, if a show playing in a casino has a lot of empty seats but the tickets to the show are expensive, the casino may choose to add a ticket to the show as a prize corresponding to a high value represented by a balance of winnings.

Figure 7:
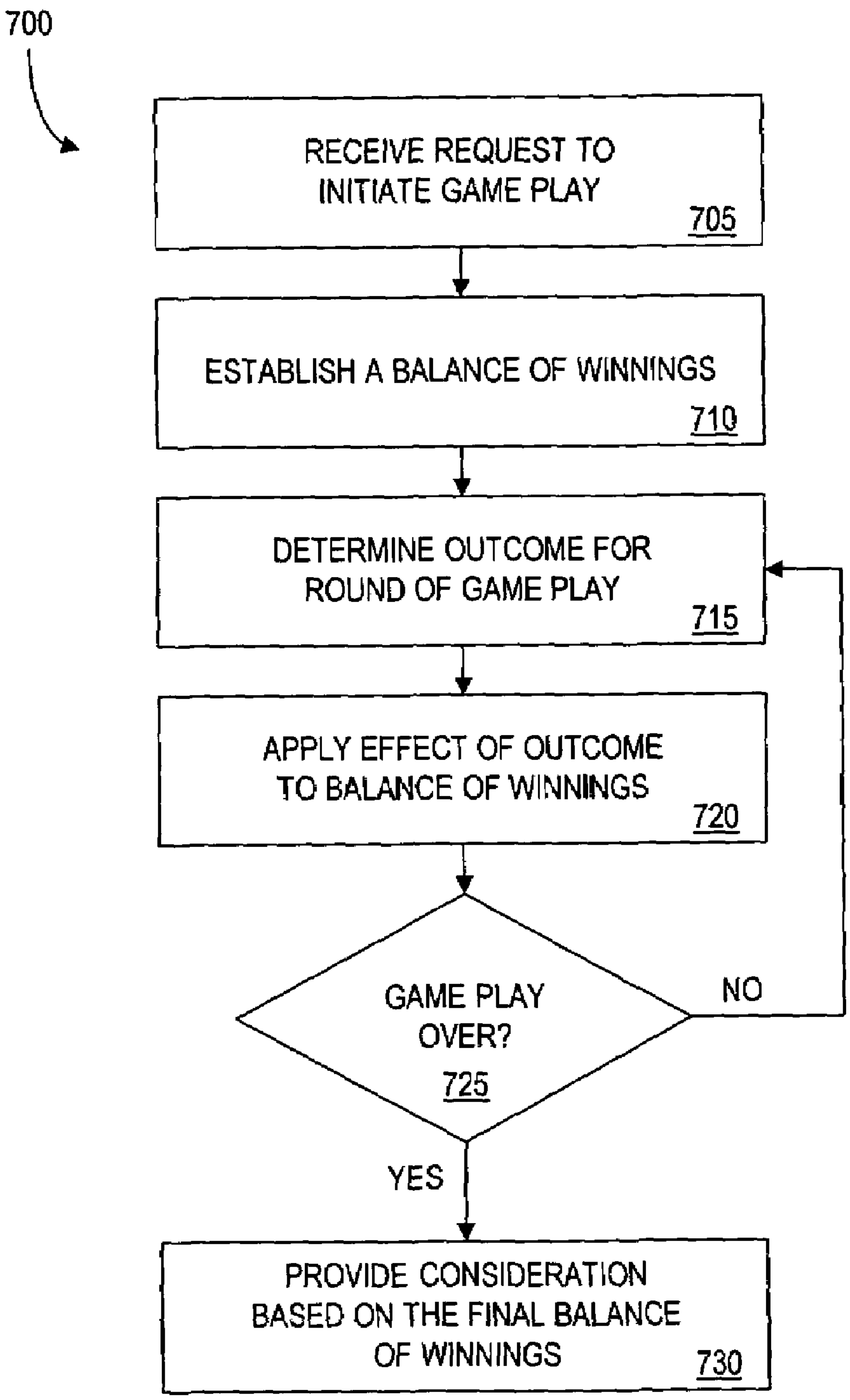
FIG. 7 is a flowchart illustrating a process for conducting a game in accordance with at least one embodiment of the present invention.

Referring now to FIG. 7, a flowchart illustrates a process 700 that may be performed by a gaming device 110. The process 700, and all other processes described herein unless expressly specified otherwise, may be performed by a gaming device 110 and /or a casino server 120. Each of these devices is described in detail above. For purposes of illustration, the steps of process 700 will be described as being performed by a gaming device 110. Further, the process 700, and all other processes described herein unless expressly specified otherwise, may include steps in addition to those expressly depicted in the Figures or described in the specification without departing from the spirit and scope of the present invention. Similarly, the steps of process 700 and any other process described herein, unless expressly specified otherwise, may be performed in an order other than depicted in the Figures or described in the specification, as appropriate.

Process 700 begins with step 705, in which a request to initiate a game play is received at a gaming device. Receiving a request to initiate a game play may comprise, for example, determining that a player has inserted into the gaming device a wager sufficient to pay for the game play. Alternatively, receiving a request to initiate a game play may comprise determining that the player has actuated a game play starting mechanism of the gaming device (e.g., a start button or handle).

In one embodiment, to initiate a game play a player may insert coins, bills, tokens, cashless gaming receipts, stored value cards, credit cards, debit cards, or any other token of value into the gaming device. The player may then indicate a wager by pressing a "bet 1" or a "bet 2" button, by pressing a "play 1 line" or "play 2 lines" button, by pressing a "spin" button, by pulling the handle of the gaming device, or in any other manner. In some embodiments, inserting tokens of value automatically indicates a desire to initiate a game play.

Once a request to initiate a game play is received, a balance of winnings is established in step 710. For example, a gaming device may retrieve from memory an amount of an initial balance of winnings and set a meter for tracking the balance of winnings to the amount, such that the amount is displayed to the player as the player's current balance of winnings. As described herein, an initial balance of winnings may be a substantially large amount (e.g., $1,000,000), so as to cause excitement on the player's part about the possibility of maintaining this large balance of winnings until the end of the game play.

In one or more embodiments, an initial balance of winnings may be established prior to a player initiating a game play. For example, a balance of winnings meter may display an initial balance of winnings for all who pass by, as a means for enticing players to begin a game play at the gaming device.

In one or more embodiments, the initial amount of the balance of winnings may be different from one game play to another. For example, the initial amount of the balance of winnings may be based on the identity of the player who is initiating the game play. In another example, the initial amount of the balance of winnings may be based on results of prior game plays completed at the gaming device (e.g., the initial balance of winnings may increase for each game play at which a player does not win at least a predetermined final balance of winnings). In yet another example, an initial amount of a balance of winnings may be based on other factors considered relevant by a casino, gaming machine manufacturer or game designer, such as (i) an amount of a wager, (ii) a payout table selected by the player, (iii) a time of day, week, month or year, and/or (iv) a current level of activity in a casino or particular area of a casino.

In one or more embodiments, a player is unable to receive a payout equal to the a current balance of winnings until after a series of outcomes has been determined for a game play (e.g., a player has completed a predetermined number or minimum number of rounds of the game play or has completed rounds of the game play for a predetermined or minimum period of time, perhaps at a predetermined minimum rate of play). That is, in such embodiments the player cannot press a "cashout" button to receive the current balance of winnings.

Further, as described above, in one or more embodiments the balance of winnings is distinct from any existing credit meter balance associated with the player. As illustrated in FIG. 4, one display 440 may display to the player a credit meter balance (which happens to be illustrated as 48 credits in the Figure) while another display 530 displays to the player a balance of winnings. The credit meter balance represents value that belongs to the player and has been left within the gaming device only for convenience. The player is typically free to cash out the credit meter balance at the player's discretion. However, the player typically cannot cash out the balance of winnings until a game play has been completed. In one or more embodiments, a player can never cash out the balance of winnings directly. Rather, once a game play is completed the final balance of winnings is transferred to the credit meter balance, which the player may then freely cash out.

In step 715 an outcome is determined for a round of the game play. An outcome may be determined automatically once a player initiates a game play, without a distinct command from the player to determine the outcome. For example, in one embodiment where a player initiates a game play that comprises a predetermined number of rounds, the gaming device may automatically and without further input from the player determine an outcome for each of the predetermined rounds (e.g., at predetermined intervals) once a player initiates the game play. In another embodiment, once the player initiates a game play, the player then must distinctly initiate each round of the game play (e.g., by pulling the handle of a slot machine or pressing the start button of a video poker machine).

The gaming device may generate each outcome in a standard fashion. For example, assuming the gaming device comprises a reel slot machine, the processor of the slot machine may spin the reels, generate a random number, match the random number to a corresponding outcome (e.g., a set of symbols) using a probability table as is known to one of ordinary skill in the art, and cause the reels to stop in such positions so that the corresponding outcome is displayed to the player.

An outcome determined in accordance with embodiments of the present invention may comprise a conventional outcome or type of outcome available on existing gaming devices. For example, an outcome may consist of three symbols arranged horizontally across a pay line, or five cards arranged into a poker hand.

Once an outcome is determined, the process 700 continues to step 720, where an effect of the outcome is applied to the current balance of winnings. As described herein, in accordance with embodiments of the present invention an outcome may correspond to an effect that is analogous to a payout. The effect associated with an outcome may cause the balance of winnings to be adjusted in some way. For example, the outcome's effect may be to add five to the balance of winnings, to subtract seven from the balance of winnings, or to cause the balance of winnings to be divided by two and thus reduced by half. Thus, in one or more embodiments, the effect of an outcome is to produce an adjusted balance of winnings that is a function of the current balance of winnings (i.e., the balance of winnings before the effect of the outcome is applied thereto).

Accordingly, in one or more embodiments each outcome may be associated with a mathematical function. The following is an exemplary list of possible effects that may be associated with an outcome, together with how these effects might be expressed when written in the form of exemplary mathematical functions. In the following exemplary mathematical functions (i) the current balance of winnings is represented by "cbw", (ii) the new balance of winnings (which will be the current balance of winnings once the effect of the outcome is applied) is represented by "nbw", and (iii) a constant is represented by "c".

(i) effect: add a constant to the current balance of winnings mathematical function: nbw=cbw+c (ii) effect: subtract a constant from the current balance of winnings mathematical function: nbw=[(cbw)−(c)]

(iii) effect: multiply the current balance of winnings by a constant mathematical function: nbw=[(cbw)×(c)]

(iv) effect: divide the current balance of winnings by a constant mathematical function: nbw=[(cbw)÷(c)]

(v) effect: raise the current balance of winnings to a power mathematical function: nbw=cbw^c (vi) effect: extract a root from the current balance of winnings mathematical function: nbw=cbw^(1/c)

(vii) effect: raise a constant to the power of the current balance of winnings mathematical function: $nbw=c^{cbw}$ (viii) effect: take the logarithm of the current balance of winnings mathematical function: nbw=Log (cbw)

Of course other effects would be understood by one of ordinary skill in the art after reading the present disclosure. For example, a current balance of winnings could be reduced by a particular percentage (e.g., 50%, 99%, etc.).

It should be noted that when an effect is applied to a current balance of winnings, the result might be a number that is not a whole number. In some embodiments, such a result may be truncated or rounded to the nearest whole number. In other embodiments, a number that is not a whole number may be displayed as the current balance of winnings.

Alternatively, the fractional amounts of a balance of winnings that were not taken from the player may be tracked, and a full coin or credit may be taken when the fractional amounts add up to a full coin or credit. In another variation, the casino may first take a full coin for any fractional amount of a balance of winnings, but allow the player to keep subsequent fractional amounts until they add up to the full coin already taken.

One benefit of outcomes that take away a percentage of a player's balance of winnings is that the player's balance of winnings cannot become a negative number. For example, a player's balance of winnings may be reduced by 50% ten times in a row, but dividing a positive number by two will never cause the number to become negative. In some embodiments, however, a player's balance of winnings is allowed to go to zero. For example, a balance of winnings equal to "1" may be set to zero if an effect of an obtained outcome that is applied to the balance of winnings otherwise causes the balance of winnings to be reduced by 50%.

In one or more embodiments, a single outcome may be associated with more than one effect. Which effect is applied upon the obtainment of the outcome may be based on various factors. For example, which effect is applied may be based on a current balance of winnings at the time the outcome is obtained. For example, if a current balance of winnings is "100 or less", then the effect of an outcome may be to reduce the balance of winnings by 50%. However, if the current balance of winnings is "greater than or equal to 100", the effect of the same outcome may be to reduce the balance of winnings by only 33%. The selection of an effect of an outcome may be dependent on other factors as well. Such factors may include, for example, (i) the time of day, week, or year; (ii) the identity of the player who obtained the outcome; (iii) a player's status as a customer of the casino; (iv) the weather conditions at the time the outcome is obtained; (v) the activity status of the casino or a particular area of the casino.

For example, a player who has visited the casino more than five times in the past year may be considered a good customer of the casino. For such good customers, if there is a choice of effects corresponding to an obtained outcome, a selection of the effect that is least detrimental to the player's current balance of winnings may be made. As another example, if it is between 3:00 am and 7:00 am, then the casino may want to encourage play, and therefore a selection of the effect that is least detrimental to the player's current win balance may be made.

In one or more embodiments, the effect associated with an outcome may operate on more than one prior balance of winnings, rather than just the current balance of winnings. For example, the effect of a "bell-bell-cherry" outcome on a reel slot machine may comprise dividing the current balance of winnings by two and adding the result to the prior win balance (e.g., the current balance of winnings as it stood before the effect of "bell-bell-cherry" was applied and/or a balance of winnings from a prior round of the game play) in order to arrive at the new win balance.

In one simple example, a player might begin with a balance of winnings of $100. The gaming device then generates an outcome. The effect of each possible outcome is to subtract a non-negative constant from the player's initial win balance. After one outcome is generated, the player may receive the remaining balance of winnings. In other words, after one spin, the player may cash out the remaining balance of winnings since the game play in this example only lasts one round. Assume the outcome obtained by the player has the associated effect of subtracting $98 from the balance of winnings. The player is thus left with $2, which may be added to the credit meter balance of the gaming device and become available for the player to cash out.

It should be noted that gaming devices operating in accordance with embodiments of the present invention might be programmed with payout tables that result in the same profit margin for a casino, as do prior art slot machines. To illustrate this point, below is a comparison of a pay table for a prior art slot machine (taken from the book "Winning At Slot Machines" by Jim Regan, Carol Publishing Group Edition, 1997) with a table of the effects of outcomes in one embodiment of the present invention (an embodiment in which a player's initial balance of winnings is 100 coins) As can be seen, the tables are equivalent in the sense that a player may finish a game play with the same number of credits using a prior art slot machine or using the slot machine operating in accordance with an embodiment of the present invention. A difference is that, in the present invention, the player begins with 100 coins in his balance of winnings and loses coins as a result of outcomes, whereas with the prior art slot machine, the player begins with 0 coins and wins coins as a result of outcomes.

TABLE 1

| Outcome | Prior Art Effect | Inventive Effect |
|---|---|---|
| cherry-any-any | +2 | −98 |
| any-any-cherry | +2 | −98 |
| cherry-cherry-any | +5 | −95 |
| any cherry-cherry | +5 | −95 |
| cherry-any-cherry | +5 | −95 |
| cherry-cherry-cherry | +20 | −80 |
| bar-orange-orange | +10 | −90 |
| orange-orange-bar | +10 | −90 |
| orange-orange-orange | +20 | −80 |
| bar-plum-plum | +14 | −86 |
| plum-plum-bar | +14 | −86 |
| plum-plum-plum | +20 | −80 |
| bar-bell-bell | +18 | −82 |
| bell-bell-bar | +18 | −82 |
| bell-bell-bell | +20 | −80 |
| bar-bar-bar | +50 | −50 |
| 7-7-7 | +100 | −0 |
| Other | +0 | −100 |

In fact, embodiments of the present invention may replicate the results of any prior art gaming device pay table in which zero or a positive number of credits are awarded to the player based on any outcome. To replicate the results of a prior art payout structure, embodiments of the present invention may allow the player to begin with a suitably large balance of winnings, and may subtract a suitable constant from the current balance of winnings for each outcome. For example, suppose an existing gaming device has a maximum payout of Pmax. Further, suppose for each outcome x, the payout is Px. Then, in embodiments of the present invention, a player may begin with a balance of winnings equaling Pmax. In accordance with embodiments of the present invention, for any outcome x, the effect is to subtract (Pmax−Px) from the current balance of winnings. After a single spin, the player may cash out his current balance of winnings. Therefore, in accordance with embodiments of the present invention, after a single spin in which a player receives an outcome of x, the player receives Pmax−(Pmax−Px)=Px. Therefore, the payout the player receives is the same whether the player is playing a gaming device utilizing a prior art payout table or a payout table of an embodiment of the present invention.

As would be recognized by one of ordinary skill in the art after reading the present disclosure, there are great variety of ways of replicating the results of prior art gaming device payout tables while realizing the benefits of the present invention (e.g., providing the player with the excitement of a substantially high initial balance of winnings). For example, referring again to the above-described example, a player might begin with an initial balance of winnings equaling (Pmax+1) and lose (Pmax−Px+1) upon the occurrence of outcome x.

In one or more embodiments, applying an effect of an outcome to a current balance of winnings may cause the balance of winnings to become a negative number. For example, assuming a current balance of winnings is twelve (12) coins and the effect of an obtained outcome is to subtract twenty (20) coins from the current balance of winnings, a simple application of the effect to the current balance of winnings would result in a new balance of winnings that is negative eight (−8). While in one or more embodiments a gaming device may be operable to display such a negative balance of winnings, in other embodiments a gaming device may be programmed to set the balance of winnings to zero if it otherwise would be a negative number.

Furthermore, in some embodiments, if an application of an effect results in a new balance of zero, the gaming device may be programmed to end the game play without determining any further outcomes (even if the predetermined number of rounds or predetermined period of time for completing the game play has not yet been achieved).

Once the effect of the outcome is applied in step 720 and a new balance of winnings determined (such that the balance of winnings meter is set to the new balance of winnings), the process 700 continues to step 725. In step 725 it is determined whether the game play is over. A game play may be determined to be over if one or more conditions for ending the game play is determined to be satisfied. Determining that such a condition has been satisfied may comprise, for example, determining that (i) a predetermined number of rounds required to complete the game play have been completed, (ii) the player has completed rounds of the game for a predetermined period of time required for completion of the game play, (iii) the player has completed rounds of the game for a predetermined period of time and at a minimum required rate of play, as required for completion of the game play, (iv) the player's rate of play is below a minimum required rate of play, and/or (v) the new balance of winnings has reached zero or a negative number.

If it is determined that the game play is not over, the process 700 returns to step 715, in which another outcome is determined for another round of the game play. If, on the other hand, it is determined that the game play is over, the process 700 continues to step 730.

Step 730 comprises providing consideration based on the final balance of winnings (i.e., the balance of winnings at the time the game play is determined to be over). For example, if the balance of winnings comprises an amount of currency, step 730 may comprise outputting the amount of currency to the player (e.g., by transferring the amount of the balance of winnings to the credit meter balance of the gaming device, thus making it available for cash out by the player) or causing a hopper of the gaming device to dispense an appropriate amount of coins or casino tokens into a coin tray of the gaming device. In another example, if the balance of winnings comprises a value of another type of prize (e.g., a comp or product to be provided to the player), step 730 may comprise causing a casino attendant to provide the prize of a value based on the final balance of winnings to the player. For example, if the final value of the prize to be provided to the player is a dinner for two at a specified casino restaurant, a casino attendant may be instructed to bring over a voucher or other certificate that entitles the player to dinner for two at the restaurant. In another example, if the prize is a credit to a financial account identifier associated with the player, step 730 may comprise communicating with a financial institution of the financial account (or with casino server 120, which may in turn communicate with the financial institution) in order to credit the appropriate amount to the financial account.

In one or more embodiments, it may be desirable for a casino, gaming device, gaming device developer and/or game developer to be able to calculate a player's expected balance of winnings for a game play. For example, an entity may desire to calculate a player's expected balance of winnings so as to ensure that the player's expected balance of winnings is less than the player's initial wager, thus ensuring that the owner of the gaming device can expect to make a profit on every game play. Following is a general and several more specific methods of calculating an expected balance of winnings for a game play.

In a first exemplary method of calculating an expected balance of winnings for a game play, let Sx be a series of outcomes, $Sx_1$, $Sx_2$, $Sx_3 \ldots Sx_n$, that may be determined for the game play. Let W(Sx) be the player's final balance of winnings at the end of the game play (i.e., after the series of outcomes Sx have been determined and their corresponding effects applied to the balance of winnings). Let P(Sx) be the probability of the series of outcomes Sx occurring. The player's expected balance of winnings once the series of outcomes has been determined is then given by:

Expected Balance of Winnings=$\Sigma_{(all\ possible\ x)}P(Sx)W(Sx)$

If each outcome in a series of outcomes is generated independently, then $P(Sx)=P(Sx_1)P(Sx_2) \ldots P(Sx_n)=\Pi_{(k=1 \ldots n)}P(Sx_k)$, and the above expression becomes:

Expected Balance of Winnings=$\Sigma_{(all\ possible\ x)}\Pi_{(k=1 \ldots n)}P(Sx_k)W(S_x)$ If the initial balance of winnings is $W_0$, and each outcome $Sx_k$ results in the subtraction of an associated non-negative constant $L(Sx_k)$ from the current win balance, then $W(Sx)=W_0-L(Sx_1)-L(Sx_2)- \ldots L(Sx_n)=W_0-\Sigma_{j=1 \ldots n)}L(Sx_j)$, and the above expression becomes:

Expected Balance of Winnings=$\Sigma_{(all\ possible\ x)}\Pi_{k=1 \ldots n)}P(Sx_k)(W_0-$ $$\begin{aligned}
\text{Expected Balance of Winnings} &= \sum_{(\text{all possible } x)} \prod_{(k=1 \ldots n)} P(Sx_k)\left(W_0 - \sum_{(j=1 \ldots n)} L(Sx_j)\right) \\
&= \sum_{(\text{all possible } x)} \left(W_0 \prod_{(k=1 \ldots n)} P(Sx_k) - \prod_{(k=1 \ldots n)} P(Sx_k)\left(\sum_{(j=1 \ldots n)} L(Sx_j)\right)\right) \\
&= \sum_{(\text{all possible } x)} W_0 \prod_{(k=1 \ldots n)} P(Sx_k) - \sum_{(\text{all possible } x)} \left(\prod_{(k=1 \ldots n)} P(Sx_k)\left(\sum_{(j=1 \ldots n)} L(Sx_j)\right)\right) \\
&= W_0 \sum_{(\text{all possible } x)} \prod_{(k=1 \ldots n)} P(Sx_k) - \sum_{(\text{all possible } x)} \left(\prod_{(k=1 \ldots n)} P(Sx_k)\left(\sum_{(j=1 \ldots n)} L(Sx_j)\right)\right) \\
&= W_0 - \sum_{(\text{all possible } x)} \left(\prod_{(k=1 \ldots n)} P(Sx_k)\left(\sum_{(j=1 \ldots n)} L(Sx_j)\right)\right)
\end{aligned}$$

This is so because $\Sigma_{(all\ possible\ x)}\Pi_{k=1 \ldots n)}P(Sx_k)$ is the sum of the probabilities of all possible series, which is equal to 1.

However, one consequence of the last expression above is that it may allow a balance of winnings to become negative for some series of outcomes. As described above, in one or more embodiments, when a balance of winnings would otherwise become negative, the balance of winnings is instead set to zero. Thus, in these embodiments, the last expression above would not allow an entity to accurately determine whether a gaming device would be profitable or not.

The setting of a balance of winnings can be more accurately captured with the following expression $W(Sx)=y{:}y=0$ if $\Sigma_{(j=1 \ldots n)}L(Sx_j)>W_0$, $W_0-\Sigma_{(j=1 \ldots n)}L(Sx_j)$ otherwise Equivalently, $W(Sx)=W_0-z{:}z=W_0$ if $\Sigma_{(j=1 \ldots n)} L(Sx_j)>W_0$, $\Sigma_{(j=1 \ldots n)}L(Sx_j)$ otherwise.

The variable "z" denotes the total amount that will have been deducted from a player's initial balance of winnings following a series of outcomes determined for a game play.

Replacing $\Sigma_{(j=1 \ldots n)}L(Sx_j)$ with z in the expression $W_0-\Sigma_{(all\ possible\ x)}(\Pi_{(k=1 \ldots n)}P(Sx_k)(\Sigma_{(j=1 \ldots n)}L(Sx_j)))$ gives:

Expected Win Balance=$W_0-\Sigma_{(all\ possible\ x)}(\Pi_{(k=1 \ldots n)}P(Sx_k)(z{:}z=W_0$ if $\Sigma_{(J=1 \ldots n)} L(Sx_j)>W_0$, $\Sigma_{(j=1 \ldots n)}L(Sx_j)$ otherwise))

Turning now to FIG. 8, a table 800 provides an illustrative example of the above calculation. Table 800 includes a number of example records or entries, R801 through R809, each defining an outcome obtainable on a gaming device. Those skilled in the art will understand that the table 800 may include any number of entries. The table 800 also defines fields for each of the entries or records. The fields specify: (i) a pair of outcomes for a single game play 805; (ii) a probability of the pair of outcomes occurring 810; (iii) a reduction to the balance of winnings 815 as a result of the pair of outcomes occurring, based on the effect of each outcome of the pair of outcomes, (iv) an expected reduction to the balance of winnings 820; (v) a total expected reduction to a balance of winnings for a game play 825 that indicates the amount by which the initial balance of winnings is expected to be reduced for a game play; and (vi) an expected balance of winnings for a game play 830 that indicates the final balance of winnings expected for a game play, determined by subtracting the total expected reduction to the balance of winnings 825 from the initial balance of winnings for the game play.

Assume, for purposes of FIG. 8, that a particular gaming device can produce only one of three outcomes: "apple-apple-apple," ("A" for short), "banana-banana-banana" ("B" for short), or "cantaloupe-cantaloupe-cantaloupe" ("C" for short). Assume further that outcome A occurs with probability ½, outcome B with probability ¼, and outcome C with probability ¼. Assume further still that outcome A has the effect of subtracting "5" from a balance of winnings, outcome B has the effect of subtracting "2" from a balance of winnings, and outcome C has the effect of subtracting nothing from a balance of winnings. These assumptions can be expressed as follows:

$$P(A)=\tfrac{1}{2} \text{ and } L(A)=5,$$

$$P(B)=\tfrac{1}{4} \text{ and } L(B)=2,$$

$$P(C)=\tfrac{1}{4} \text{ and } L(C)=0.$$

Further assume that the initial balance of winnings for a game play is set to "5". Table 800 illustrates the calculation of the expected win balance by listing all possible pairs of obtainable outcomes in field 805, the corresponding probability of each pair ($\Pi_{(k=1 \ldots n)}P(Sx_k)$) in field 810, and the corresponding amount z that will have been deducted from a player's initial balance of winnings as a result of the pair of outcomes in field 815.

As illustrated in field 830, a player will finish a game play with an average win balance of "0.75". Assuming that, to initiate the game play, the player must place an initial wager of "1", the casino or other operator of the gaming device can expect to profit, on average, "0.25" per wager, which may be considered to be an acceptable house advantage. Of course, as one of ordinary skill in the art would understand after reading the present disclosure, the probabilities and effects of individual outcomes, the number of obtainable outcomes, the number of outcomes required per game play, the wager amount, and/or the initial balance of winnings can be adjusted to change the expected profit for the casino per game play as desired.

In one embodiment, the value of a prize that is provided to a player as a result of a game play may be determined based on a number of rounds of the game play that the player completes before the balance of winnings reaches a predetermined threshold. For example, a game play may require a player to keep initiating rounds of the game play until the balance of winnings reaches zero. The prize that the player receives as a result of the game play may be determined based on the number of rounds the player completed before the balance of winnings reached zero. It is contemplated that the higher the number of rounds completed, the more valuable the prize that is provided to the player. A player may, for example, receive a payout of 1 credit for every three rounds completed in the game play, with the number of credits rounded down to the nearest whole credit.

Referring now to FIG. 9, depicted therein is a pair of tables, table 900 and table 950 that may be used to implement the embodiment described immediately above. Table 900 illustrates the probability of obtaining various effects (i.e., outcomes corresponding to the various effects depicted) during a game play. Table 950 illustrates a payout schedule, depicting the value of a prize that is to be provided to a player based on the number of rounds the player completes before the balance of winnings reaches zero.

Table 900 consists of a plurality of entries or records, each record defining an effect that corresponds to an outcome obtainable on a gaming device utilizing table 900. Table 900 also includes a plurality of fields or columns for each of the entries, the fields including: (i) an effect of an outcome obtainable on the gaming device 910, and (ii) a probability of obtaining an outcome that corresponds to the effect 920. Table 900 also illustrates, in field 905, that the initial balance of winnings for a game play in which table 900 is utilized is $1,000,000. Accordingly, when a player initiates a round of a game play on a gaming device utilizing table 900, a random number may be generated and the outcome corresponding to the random number determined. The effect of the outcome is then determined (e.g., from a table that corresponds outcomes to effects; such information may be included in table 900). Table 900 illustrates how often an effect and thus outcome corresponding to the effect should occur, on average.

Table 950 consists of a plurality of entries or records, each record defining a prize that is to be provided to a player. Table 950 also includes a plurality of fields or columns for each of the entries, the fields including: (i) a wager 955 that indicates the wager required to initiate a game play; (ii) a number of rounds 960 that have been completed by a player in a game play; and (iii) a prize 965 that corresponds to each number of rounds or range of number of rounds.

Table 950 may be utilized by a gaming device once it has been determined that a game play is over. For example, in an embodiment where the value of a player's prize for a game play is determined based on how many rounds the player completed before the balance of winnings reached zero, table 950 may be accessed once it is determined that the balance of winnings has reached zero. Table 950 is used to look up, based on the number of rounds completed, the value of the prize to be provided to the player. It should be noted that the type of prize depicted in table 950 is an amount of currency. Of course, other types of prizes may be provided and depicted in table 950. For example, a type of prize is a number of comp points to be awarded to a player. In such an example, table 950 may depict in field 965 the number of comp points corresponding to each number of rounds or range of number of rounds. In another example, field 965 may depict a level of a prize corresponding to each number of rounds or range of number of rounds. Each level may correspond to a different prize or group of prizes. For example, level 1 may correspond to a dinner for 4 at a casino restaurant, level 2 may correspond to a dinner for 3 at a casino restaurant, level 3 may correspond to dinner for 2 at a casino restaurant, level 4 may correspond to dinner for 1 at a casino restaurant, and level 5 may correspond to no prize. As would be understood by one of ordinary skill in the art after reading the present disclosure, any type of prize and the various values thereof may be depicted in table 950.

Additional Embodiments of the Invention

In one or more embodiments, a player's balance of winnings may be reduced based on factors in addition to the effects of outcomes obtained by the player during a game play. For example, in one embodiment a predetermined amount (e.g., "100") may be deducted from the balance of winnings for each predetermined amount of time (e.g., one second) during which a new round of the game play is not initiated from a time of completion of a previous round. In this manner a player may be encouraged to complete a game play more rapidly than the player otherwise would.

It is conceivable that under some circumstances a player may leave a gaming device prior to completing a game play. Thus, in one or more embodiments, a gaming device 110 and /or a casino server 120 may be programmed to store a record of the player's game play situation (perhaps only for a maximum predetermined amount of time). Alternatively, the game situation may be stored on a player's player tracking card and be read by a gaming device when inserted into the gaming device. For example, a gaming device 110 may store the player's name, the number of rounds remaining in the game play, and the current balance of winnings at the time the player discontinues playing the game play. Thus, when the player returns to the gaming device (or initiates play at another gaming device operable to carry out a game play in accordance with embodiments of the present invention), the player may insert his player tracking card to prove his identity, and may then continue the game play from the point at which he left off.

If so desired, embodiments of the present invention may be practiced as a bonus feature of a conventional game on a gaming device. For example, a player at a conventional gaming device who lined up three bonus symbols might gain access to a bonus feature in which he would receive an initial balance of winnings equaling $1,000,000. The player may then be required to complete five rounds of the game (e.g., five spins of a slot machine) and be provided with the portion of the balance of winnings that remained once the effects of the outcomes obtained during the five rounds had been applied to the balance of winnings. The gaming device may then return to conventional play.

In one or more embodiments, an outcome the effect of which would otherwise set a balance of winnings to a negative number may instead cause the balance of winnings to cycle back to the initial balance of winnings. For example, assume an initial balance of winnings for a game play equals ten free plane tickets to any destination in the U.S. Further assume that after four rounds of the game play, the balance of winnings has been reduced down to one free plane ticket. Further assume that the outcome obtained on the fifth round has an associated effect of subtracting two tickets from the balance of winnings. Since the current balance of winnings stands at only one ticket, subtracting two tickets would cause the balance of winnings to be negative one ticket. However, in one embodiment, the balance of winnings may instead go to zero after the subtraction of the first ticket, then cycle back to ten, and then end up at nine tickets after the subtraction of the second ticket.

In one or more embodiments, a balance of winnings may be reduced or otherwise adjusted based on a cumulative effect of more than one outcome (e.g., through the accumulation of several symbols acquired from multiple outcomes, the symbols being part of the outcomes). For example, achieving three cherry symbols during a game play may cause a balance of winnings to be reduced by half once the third cherry symbol is achieved. Therefore, a player who obtains one cherry symbol on a first round of a game play would not have his balance of winnings effected. However, if the player then obtained two cherry symbols on a second round of the game play the balance of winnings would be reduced by half after the second round. Such an embodiment may be practiced, if desired, as a secondary game that is tracked during conventional play of a gaming device. For example, a player may play a gaming device and receive traditional payouts from the gaming device based on outcomes obtained. In addition, however, a balance of winnings may be tracked during the player's gaming session in accordance with embodiments of the present invention. Thus, while an outcome may result in the player obtaining a payout based on a conventional payout schedule, the same outcome may cause the player's balance of winnings to be reduced in the secondary game (e.g., if the outcome includes a symbol that causes a balance of winnings to be reduced).

In the embodiment described immediately above, the balance of winnings may additionally (i.e., in addition to being reduced based on the symbols accumulated over multiple rounds of game play) be reduced or adjusted by a further amount based on the outcomes the player achieves on the multiple rounds. For example, in the above example where the player's balance of winnings was reduced by half based on the accumulation of three cherry symbols, the balance of winnings may further be reduced or otherwise adjusted based on effects corresponding to the outcomes in which the cherry symbols appeared.

It should be noted that, in some embodiments such as the embodiment described immediately above, the order in which multiple effects are applied might be important. Accordingly, one or more rules may be programmed into a gaming device for governing the order in which the effects are to be applied. For example, in the above embodiment where a balance of winnings is adjusted based on the effect of symbols accumulated over a plurality of outcomes and on the effect associated with each outcome, a rule may specify that the effects that are based on the accumulation of symbols are to be applied in a predetermined temporal relationship to the effects that are based on individual outcomes. As an illustrative example, assume a balance of winnings is equal to 5,000 coins and an outcome of cherry-bar-bell is obtained. Assume that the effect of the outcome is to subtract 1,000 coins from the balance of winnings. Further assume that, in obtaining the outcome, the player has accumulated a third cherry symbol, and the effect of an accumulation of three cherry symbols is to reduce the balance of winnings by half. If the effect corresponding to the accumulation of the three cherry symbols were to be applied first and the effect corresponding to the outcome were to be applied second, then the balance of winnings would first be reduced by half to 2,500 coins and then reduced by 1,000 coins to 1,500 coins. However, if the effect corresponding on the outcome cherry-bar-bell were to be applied first and the effect corresponding to the accumulation of the three cherry symbols were to be applied second, then the balance of winnings would first be reduced by 1,000 coins to 4,000 coins and then reduced by half to 2,000 coins. As can be seen, the latter order is more favorable to the player. Since the order in which the effects are applied is important, the gaming device may be programmed to apply effects in a predetermined manner, as desired by the casino or other entity.

It should be noted that, a gaming device has been described herein as comprising a distinct credit meter balance and a distinct balance of winnings, in one or more embodiments, there may only be one balance that represents both these measures. For example, a gaming device may be programmed to accept only a single wager at a time (e.g., if the wager for a game play is $5, then the gaming device may be operable to only accept $5, and not amounts higher or lower than this). When the gaming device receives a wager for a game play, instead of displaying the $5 in a balance meter, the gaming device may instead automatically display an initial balance of winnings that represents the highest value of a prize the player may win on the gaming device (e.g., $1,000,000). Then, to prevent the player from cashing out the balance of winnings prior to the end of the game play, the gaming device may disable the cash out button or be programmed to disregard any cash out requests made prior to the end of the game play. At the end of the game play, the player may be allowed to cash out the final balance of winnings. Accordingly, two separate meters (one to track a balance of winnings and another to track credits available to the player) may not be necessary in embodiments of the present invention.

It should be noted that, although a gaming device has been described herein as being operable to facilitate a game play in accordance with embodiments of the present invention, such a gaming device may also be operable to facilitate conventional game play. For example, a gaming device may be programmed with to operate in a conventional mode and in a mode in accordance with embodiments of the present invention. A casino attendant and /or a player may be allowed, e.g., via a menu or mechanism of the gaming device, to select one of the modes for a game play.

CONCLUSION

It is clear from the foregoing discussion that the disclosed systems and methods to facilitate the provision of new and exciting payout structures at gaming devices represent improvements in the art of gaming. While the methods and apparatus of the present invention have been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof.

What is claimed is:

1. A method of operating a gaming system, said method comprising:

receiving, via a gaming device, a wager for initiating a game play of a game, wherein the game play comprises a predetermined number of rounds of the game and the wager is an amount sufficient to pre-pay for the predetermined number of rounds;

in response to the wager, establishing, via the gaming device, an initial balance of winnings which can be won by a player for said game play, wherein the initial balance of winnings is greater than the amount of the wager;

prior to displaying any outcome for any of said predetermined number of rounds, displaying the initial balance of winnings which can be won by the player for said game play;

determining, via the gaming device, a predetermined number of outcomes, the predetermined number of outcomes comprising at least one respective outcome for each of the predetermined number of rounds;

displaying the determined outcome for each of the predetermined number of rounds;

adjusting, via the gaming device, the initial balance of winnings for said game play based on at least one of the determined outcomes, thereby determining a current balance of winnings, wherein at least one of the outcomes causes the current balance of winnings to be less than the initial balance of winnings;

when a predetermined subset of the predetermined number of rounds is complete:

(i) determining, via the gaming device, a final balance of winnings based on the current balance of winnings; and (ii) providing the determined final balance of winnings to the player.

2. The method of claim 1, wherein the player is unable to cash out the current balance of winnings until after the predetermined number of rounds is complete.

3. The method of claim 1, wherein providing the final balance of winnings comprises:

adding the final balance of winnings to a credit meter balance of the gaming device.

4. The method of claim 1, further comprising:

establishing, based on the wager, a credit meter balance that is distinct from the initial balance of winnings.

5. The method of claim 1, wherein the initial balance of winnings is established prior to any outcome being determined.

6. The method of claim 1, wherein adjusting the initial balance of winnings comprises:

determining one of said outcomes of the predetermined number of outcomes;

determining an effect on the game play corresponding to the determined one of the outcomes; and applying the determined effect to the game play.

7. The method of claim 6, wherein the effect on the game play comprises an effect on a current balance of winnings that corresponds to the outcome, and wherein applying the effect to the game play comprises applying the effect to the current balance of winnings.

8. The method of claim 6, further comprising:

accessing a database that stores a plurality of obtainable outcomes, each of the obtainable outcomes corresponding to a respective effect on the game play.

9. The method of claim 1, further comprising:

automatically initiating each round of the predetermined number of rounds, without requiring an input to do so from the player.

10. The method of claim 1, further comprising:

initiating each round of the predetermined number of rounds in response to a command to do so from the player.

11. The method of claim 1, wherein at least one of the outcomes of the predetermined number of outcomes comprises an outcome that grants a privilege to the player.

12. The method of claim 11, wherein the privilege comprises at least one of:

permission to avoid an effect of at least one of the determined outcomes;

a reduction in the predetermined number of rounds; and an increase in the final balance of winnings.

13. The method of claim 11, further comprising:

applying the privilege to the game play at a time the privilege is obtained.

14. The method of claim 11, further comprising:

applying the privilege to the game play in response to a command from the player to do so.

15. The method of claim 11, wherein the privilege is associated with at least one constraint.

16. The method of claim 15, wherein the at least one constraint comprises at least one of:

a predetermined number of rounds from the round in which the privilege is obtained, within which the privilege must be applied;

a predetermined number of game plays from a game play in which the privilege is obtained, within which the privilege must be applied; and a predetermined period of time from a time at which the privilege is obtained, within which the privilege must be applied.

17. The method of claim 11, further comprising:

storing an indication of the privilege with an identifier of the player for future use of said privilege by the player.

18. The method of claim 1, wherein adjusting the initial balance of winnings comprises:

determining, based on at least one of the determined outcomes, that adjusting the initial balance of winnings would result in a negative balance of winnings; and setting the current balance of winnings to be zero.

19. The method of claim 1, wherein adjusting the initial balance of winnings comprises:

adjusting the initial balance of winnings such that the current balance of winnings is a fractional amount.

20. A method of operating a gaming system, said method comprising:

receiving, via a gaming device, a wager for initiating a game play of a game, wherein the game play comprises a predetermined amount of time during which consecutive rounds of the game are to be played;

establishing, via the gaming device, in response to the wager, an initial balance of winnings which can by won by a player for said game play, wherein the initial balance of winnings is greater than the amount of the wager;

prior to displaying any outcome for any round of the game of said game play, displaying the initial balance of winnings which can be won by the player for said game play;

determining, via the gaming device, a number of outcomes during the predetermined amount of time, each of the outcomes corresponding to a respective round of the game;

displaying the determined outcome for each of said number of outcomes;

adjusting, via the gaming device, the initial balance of winnings based on at least one of the determined outcomes, thereby determining a current balance of winnings, wherein at least one of the outcomes causes the current balance of winnings to be less than the initial balance of winnings;

when a predetermined subset of the predetermined amount of time has elapsed:

(i) determining, via the gaming device, a final balance of winnings based on the current balance of winnings at the end of the predetermined subset of the predetermined amount of time; and (ii) providing the determined final balance of winnings to the player.

21. The method of claim 20, wherein the game play further comprises a minimum rate of play for the predetermined amount of time, such that the player must initiate rounds of the game at the minimum rate of play in order to qualify for the final balance of winnings.

22. The method of claim 20, wherein the player is unable to cash out the final balance of winnings until after the predetermined amount of time ends.

23. The method of claim 20, wherein providing the final balance of winnings comprises:

adding the final balance of winnings to a credit meter balance of the gaming device.

24. The method of claim 20, further comprising:

establishing, based on the wager, a credit meter balance that is distinct from the initial balance of winnings.

25. The method of claim 20, wherein the initial balance of winnings is established prior to any outcome being determined.

26. The method of claim 20, wherein adjusting the initial balance of winnings comprises:

determining one of the outcomes of the number of outcomes;

determining an effect on the game play corresponding to said determined one of the outcomes; and applying the determined effect to the game play.

27. The method of claim 26, wherein the effect on the game play comprises an effect on a current balance of winnings that corresponds to the outcome, and wherein applying the effect to the game play comprises applying the effect to the current balance of winnings.

28. The method of claim 26, further comprising:

accessing a database that stores a plurality of obtainable outcomes, each of the obtainable outcomes corresponding to a respective effect on the game play.

29. The method of claim 20, further comprising:

automatically initiating, during the predetermined amount of time, rounds of the game at a predetermined rate.

30. The method of claim 20, wherein determining a number of outcomes comprises:

receiving, from the player, a command to initiate a round of the game; and determining an outcome in response to the command.

31. The method of claim 20, wherein at least one of the determined outcomes comprises an outcome that grants a privilege to the player.

32. The method of claim 31, wherein the privilege comprises at least one of:

permission to avoid an effect of at least one of the determined outcomes;

a reduction in the predetermined amount of time; and an increase in the final balance of winnings.

33. The method of claim 31, further comprising:

applying the privilege to the game play at a time the privilege is obtained.

34. The method of claim 31, further comprising:

applying the privilege to the game play in response to a command from the player to do so.

35. The method of claim 31, wherein the privilege is associated with at least one constraint.

36. The method of claim 35, wherein the at least one constraint comprises at least one of:

a predetermined number of rounds from a round in which the privilege is obtained, within which the privilege must be applied;

a predetermined number of game plays from a game play in which the privilege is obtained, within which the privilege must be applied; and a predetermined period of time from a time at which the privilege is obtained, within which the privilege must be applied.

37. The method of claim 31, further comprising:

storing an indication of the privilege with an identifier of the player for future use of said privilege by the player.

38. The method of claim 20, wherein adjusting the initial balance of winnings comprises:

determining, based on at least one of the determined outcomes, that adjusting the initial balance of winnings would result in a negative balance of winnings; and setting the current balance of winnings to be zero.

39. The method of claim 20, wherein adjusting the initial balance of winnings comprises:

adjusting the initial balance of winnings such that the current balance of winnings is a fractional amount.

40. A method of operating a gaming system, said method comprising:

establishing, via the gaming device, at the initiation of a game play at a gaming device, an initial value of a prize which can be won by a player for said game play, wherein the game play ends once at least one of a predetermined number of rounds of the game are completed and a predetermined amount of time has passed;

prior to displaying any outcome for said game play, displaying the initial value of the prize which can be won by the player for said game play;

determining, via the gaming device, a series of outcomes for the game play, each respective outcome of said series of outcomes corresponding to a round of the game play;

displaying said determined outcomes of the series of outcomes;

adjusting, via the gaming device, the initial value of the prize based on the determined outcomes, thereby determining a current value of the prize, wherein at least one of the determined outcomes causes the current value of the prize to be less than the initial value of the prize;

once the game play ends, determining, via the gaming device, a final value of the prize; and outputting the prize of the final value to the player.

41. The method of claim 40, wherein the prize comprises at least one of:

currency;

alternate currency;

a product; and a service.

42. A method of operating a gaming system, said method comprising:

establishing, via a gaming device, an initial value of a prize which can be won by a player, said initial value of the prize being distinct from a balance of credits available to the player for wagering on a game at the gaming device;

prior to displaying any outcome for any wagered on play of said game, displaying the initial value of the prize to the player;

determining, via the gaming device, a series of outcomes;

displaying said determined outcomes of the series of outcomes;

after each of the outcomes of the series of outcomes is displayed, determining, via the gaming device, a current value of the prize based on an effect associated with said displayed outcome, wherein at least one of the outcomes of the series of outcomes causes the current value of the prize to be less than the initial value of the prize;

determining, via the gaming device, that the current value of the prize is zero;

determining, via the gaming device, a number of outcomes that were displayed before the current value of the prize reached zero; and providing a reward to the player based on the number of outcomes.

43. A method of operating a gaming system, said method comprising:

(a) receiving, via a gaming device, a wager for initiating a game play of a game, wherein the game play comprises a predetermined number of rounds of the game and the wager is an amount sufficient to pre-pay for the predetermined number of rounds;

(b) in response to the wager and prior to any outcome being determined for said game play:

(i) establishing, via the gaming device, an initial balance of winnings which can be won by a player for said game play, wherein the initial balance of winnings is greater than the amount of the wager; and (ii) causing a display of said initial balance of winnings;

(c) establishing, via the gaming devices, a credit meter balance, said credit meter balance being distinct from the initial balance of winnings for said game play;

(d) determining, via the gaming device, a predetermined number of outcomes, the predetermined number of outcomes comprising at least one respective outcome for each of the predetermined number of rounds;

wherein at least one of the outcomes of the predetermined number of outcomes comprises an outcome that grants a privilege to the player, said privilege comprising at least one of:

(i) permission to avoid an effect of at least one of said determined outcomes;

(ii) reduction in the predetermined number of rounds; and (iii) an increase in a final balance of winnings;

wherein the privilege is applied to the game play at a time the privilege is obtained and in response to a command from the player to do so;

wherein the privilege is associated with at least one constraint, said at least one constraint comprising at least one of:

(i) a predetermined number of rounds from a round in which the privilege is obtained, within which the privilege must be applied;

(ii) a predetermined number of game plays from a game play in which the privilege is obtained, within which the privilege must be applied; or (iii) a predetermined period of times from a time at which the privilege is obtained, within which the privilege must be applied;

(e) storing, via the gaming device, an indication of any privilege granted to the player with an identifier of the player for future use by the player;

(f) determining, via the gaming device and based on a command received from the player, whether to automatically initiate each round of the predetermined rounds, without further input to do so from the player;

(g) adjusting, via the gaming device, the initial balance of winnings based on at least one of the determined outcomes, thereby determining a current balance of winnings, wherein at least one of the outcomes causes the current balance of winnings to be less than the initial balance of winnings;

wherein adjusting the initial balance of winnings based on at least one of the determined outcomes comprises:

(i) accessing a database that stores a plurality of obtainable outcomes, each of the obtainable outcomes corresponding to a respective effect on the game play;

(ii) determining an effect on the game play corresponding to said at least one of the determined outcomes; and (iii) applying the determined effect to the game play;

(h) determining, via the gaming device and after the predetermined number of rounds is complete, the final balance of winnings; and (i) providing, via the gaming device, the final balance of winnings to the player;

wherein the player is unable to cash out the final balance of winnings until the predetermined number of rounds is complete; and wherein providing the final balance of winnings comprises adding the final balance of winnings to the credit meter balance of the gaming device.

44. A method of operating a gaming system, said method comprising:

(a) receiving, via a gaming device, a wager for initiating a game play of a game, wherein the game play comprises a predetermined amount of time during which consecutive rounds of the game are to be played;

(b) in response to the wager, establishing, via the gaming device, an initial balance of winnings which can be won by a player for said game play, wherein the initial balance of winnings is greater than the amount of the wager;

(c) prior to displaying any outcome for any round of the game of said game play, displaying said initial balance of winnings which can be won by the player for said game play;

determining, via the gaming device, a number of outcomes during the predetermined amount of time, each of the outcomes corresponding to a respective round of the game;

(d) displaying the determined outcome for each of said number of outcomes;

(e) adjusting, via the gaming device, the initial balance of winnings based on at least one of the determined outcomes, thereby determining a current balance of winnings, wherein at least one of the outcomes causes the current balance of winnings to be less than the initial balance of winnings;

(f) when the predetermined amount of time ends, determining, via the gaming device, a final balance of winnings; and (g) providing the final balance of winnings to the player;

wherein the game play further comprises a minimum rate of play for the predetermined amount of time, such that the player must initiate rounds of the game at the minimum rate of play in order to qualify for the final balance of winnings;

wherein the player is unable to cash out the final balance of winnings until the predetermined amount of time ends; and wherein at least one of the determined outcomes comprises an outcome that grants a privilege to the player, said privilege comprising at least one of:

(i) permission to avoid an effect of an outcome of the determined outcomes;

(ii) a reduction in the predetermined amount of time; and (iii) an increase in the final balance of winnings.

* * * * *

UNITED STATES PATENT AND TRADEMARK OFFICE

CERTIFICATE OF CORRECTION

PATENT NO. : 7,722,458 B2
APPLICATION NO. : 10/689975
DATED : May 25, 2010
INVENTOR(S) : Walker et al.

It is certified that error appears in the above-identified patent and that said Letters Patent is hereby corrected as shown below:

IN THE CLAIMS:

In Claim 43, Column 42, line 6, replace "via the gaming devices" with --via the gaming device--.

In Claim 43, Column 42, line 34, replace "period of times" with --period of time--.

Signed and Sealed this

Third Day of August, 2010

David J. Kappos
*Director of the United States Patent and Trademark Office*